US011073962B2

(12) United States Patent
Ishida

(10) Patent No.: US 11,073,962 B2
(45) Date of Patent: Jul. 27, 2021

(54) INFORMATION PROCESSING APPARATUS, DISPLAY CONTROL METHOD, AND PROGRAM

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 15/879,918

(22) Filed: Jan. 25, 2018

(65) Prior Publication Data
US 2018/0217735 A1 Aug. 2, 2018

(30) Foreign Application Priority Data

Jan. 31, 2017 (JP) .............................. JP2017-016210

(51) Int. Cl.
G06F 3/048 (2013.01)
G06F 3/0481 (2013.01)
G06F 3/0486 (2013.01)
G06T 11/60 (2006.01)
(Continued)

(52) U.S. Cl.
CPC ........ G06F 3/04817 (2013.01); G06F 3/0482 (2013.01); G06F 3/0486 (2013.01); G06T 11/60 (2013.01); G06Q 30/0641 (2013.01)

(58) Field of Classification Search
CPC . G06T 11/60; G06T 2200/24; H04N 1/00148; H04N 1/00188; H04N 1/00196; H04N 1/00167; H04N 1/00169; H04N 1/00198; G06F 3/0486; G06F 3/0488; G06F 3/017; G06F 3/0304; G06F 3/04842; G06F 1/1694; G06F 3/04883; G06F 3/04817; G06F 3/04845
See application file for complete search history.

(56) References Cited

U.S. PATENT DOCUMENTS 5,838,563 A * 11/1998 Dove ................. G05B 19/0426
700/83
6,392,675 B1 * 5/2002 Becker ............... G06F 3/04812
715/856
(Continued)

FOREIGN PATENT DOCUMENTS

JP 2010-145523 A 7/2010
JP 2012-155558 A 8/2012
(Continued)

Primary Examiner — Linh K Pham
(74) Attorney, Agent, or Firm — Canon U.S.A., Inc. IP Division

(57) ABSTRACT

An information processing apparatus that causes an item to be displayed in a display region of a display unit includes a first control unit that moves an item placed in a predetermined placement region of a plurality of placement regions set in the display region based on a user drag operation, a second control unit that performs, in a case where the drag operation is released in an area other than the plurality of placement regions, cancel processing for placing the item in any placement region of the plurality of placement regions, and a third control unit that stops the cancel processing in a case where inputting to the display region by the user is received before the cancel processing performed by the second control unit is completed.

24 Claims, 26 Drawing Sheets

(51) Int. Cl.
*G06F 3/0482* (2013.01)
*G06Q 30/06* (2012.01)

(56) References Cited

U.S. PATENT DOCUMENTS

| | | | | |
|---|---|---|---|---|
| 8,024,658 | B1* | 9/2011 | Fagans | G06Q 30/0621 |
| | | | | 715/243 |
| 9,529,527 | B2* | 12/2016 | Yamamoto | G06F 3/04883 |
| 2006/0190841 | A1* | 8/2006 | Lee | G06F 3/0482 |
| | | | | 715/810 |
| 2011/0271182 | A1* | 11/2011 | Tsai | G06F 3/0486 |
| | | | | 715/702 |
| 2012/0079432 | A1* | 3/2012 | Lee | G06F 3/0483 |
| | | | | 715/838 |
| 2012/0176543 | A1* | 7/2012 | Jeong | G06F 3/0482 |
| | | | | 348/563 |
| 2012/0287065 | A1* | 11/2012 | Oshinome | G06F 3/0486 |
| | | | | 345/173 |
| 2013/0321340 | A1* | 12/2013 | Seo | G06F 3/04883 |
| | | | | 345/174 |
| 2014/0085238 | A1* | 3/2014 | Kim | G06F 3/0416 |
| | | | | 345/173 |
| 2014/0108933 | A1* | 4/2014 | Lee | G06F 3/04817 |
| | | | | 715/722 |
| 2014/0317545 | A1 | 10/2014 | Miyazaki et al. | |
| 2015/0062027 | A1* | 3/2015 | Yang | G06F 3/0483 |
| | | | | 345/173 |
| 2016/0170600 | A1* | 6/2016 | Horiike | G06F 3/0486 |
| | | | | 715/769 |
| 2017/0357915 | A1* | 12/2017 | Holmes | G06Q 10/02 |

FOREIGN PATENT DOCUMENTS

| | | |
|---|---|---|
| JP | 2013-114640 A | 6/2013 |
| JP | 2013-235359 A | 11/2013 |
| JP | 2016-115337 A | 6/2016 |
| JP | 2016-219890 A | 12/2016 |

* cited by examiner

FIG.7

| IMAGE ID | IMAGE CAPTURING DATE AND TIME | FOCUS | NUMBER OF FACES | PERSONAL ID | | | | | | |
|---|---|---|---|---|---|---|---|---|---|---|
| | | | | 1 | | 2 | | 3 | | ... |
| | | | | UPPER LEFT POSITION | LOWER RIGHT POSITION | UPPER LEFT POSITION | LOWER RIGHT POSITION | UPPER LEFT POSITION | LOWER RIGHT POSITION | |
| 1 | 2015/7/1 10h 11m 12s | ○ | 6 | 40, 40 | 65, 65 | 90, 40 | 115, 65 | 10, 20 | 25, 35 | ... |
| 2 | 2015/7/1 10h 12m 30s | ○ | 2 | 50, 100 | 100, 150 | 150, 125 | 190, 165 | 150, 125 | 190, 165 | ... |
| 3 | 2015/7/1 10h 15m 54s | ○ | 0 | — | — | — | — | — | — | ... |
| ... | ... | ... | ... | ... | ... | ... | ... | ... | ... | ... |

FIG.9

| SCENE | IMAGE CAPTURING PERIOD (HOURS) | | NUMBER OF CAPTURED IMAGES (IMAGES) | | NUMBER OF PERSONS SUBJECTED TO IMAGE CAPTURING (PERSONS) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG.10A

| SCENE | IMAGE FEATURE FOR MAIN SLOT | IMAGE FEATURE FOR SUB-SLOT |
|---|---|---|
| TRAVEL | ZOOMED-OUT IMAGE CONTAINING PERSON AND LANDSCAPE | IMAGE CONTAINING CLOSE-UP OF FACE OR PROFILE |
| DAILY LIFE | IMAGE CONTAINING CLOSE-UP OF FACE OR PROFILE | ZOOMED-OUT IMAGE CONTAINING PERSON AND LANDSCAPE |
| CEREMONY | IMAGE CONTAINING TWO PERSONS CLOSE IN DISTANCE | IMAGE CONTAINING LARGE NUMBER OF PERSONS |

FIG.10B

| IMAGE ID | SCORE (PERFECT 50 POINTS) | |
|---|---|---|
| | MAIN SLOT (POINTS) | SUB-SLOT (POINTS) |
| 1 | 20 | 40 |
| 2 | 45 | 10 |
| 3 | 10 | 20 |
| ... | ... | ... |

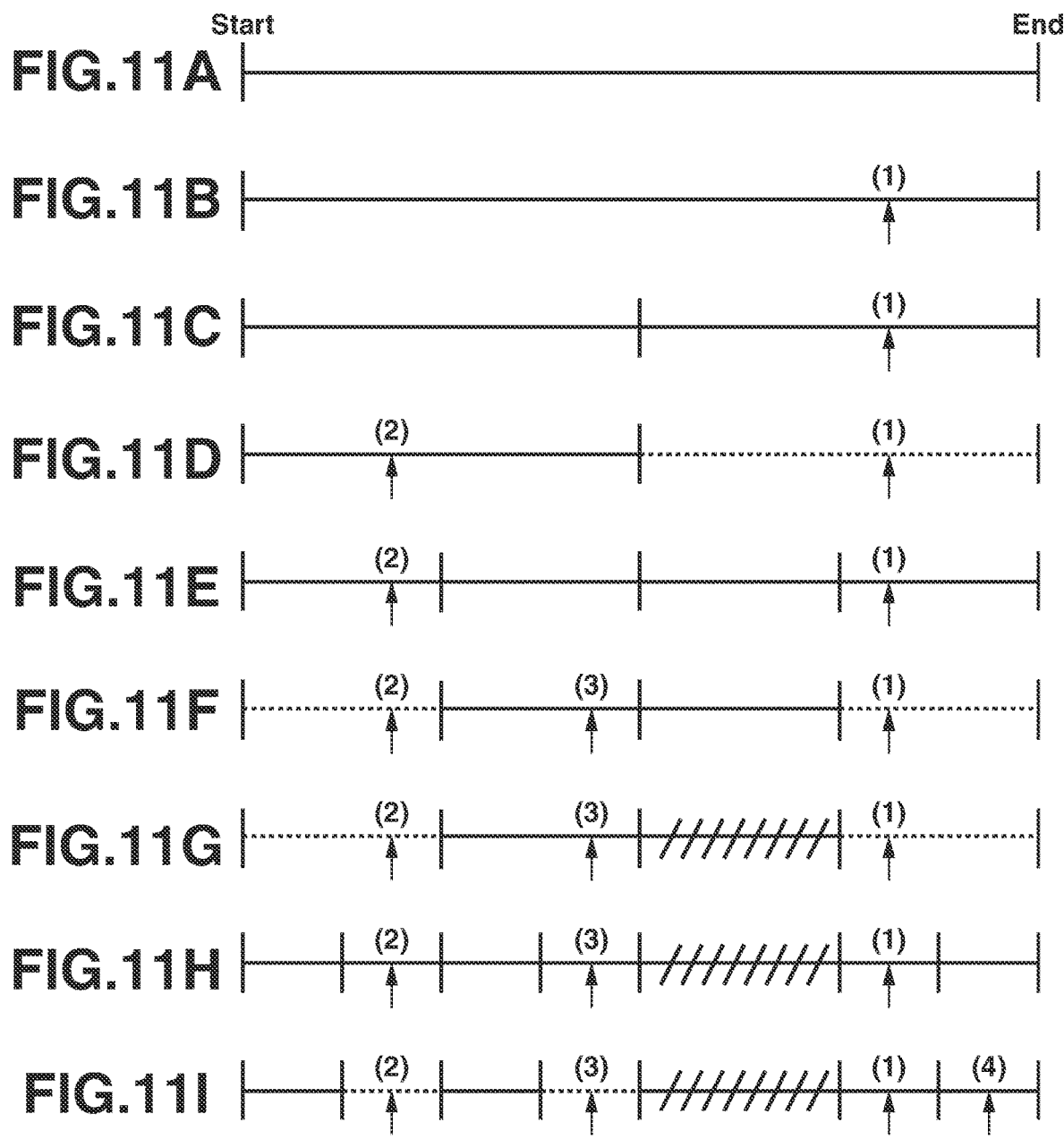

FIG.12
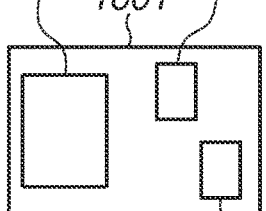
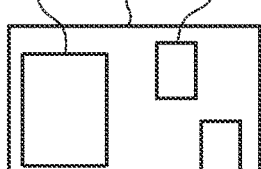 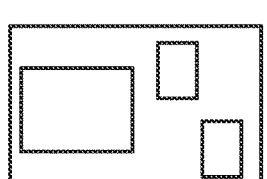 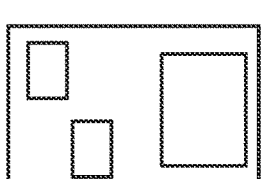 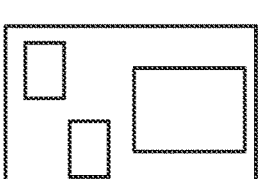
(1-1) 1604   (2-1)   (3-1)   (4-1)
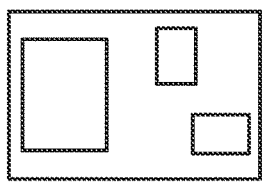 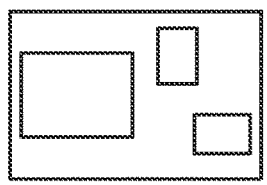 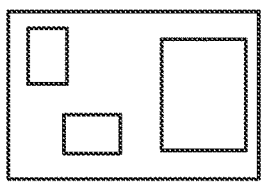 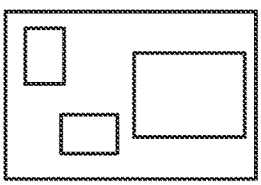
(1-2)   (2-2)   (3-2)   (4-2)
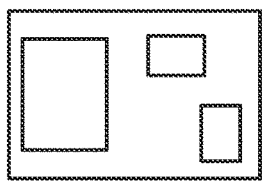 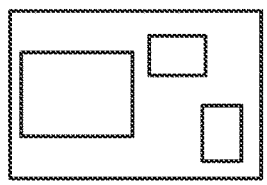 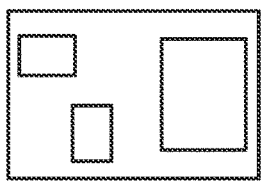 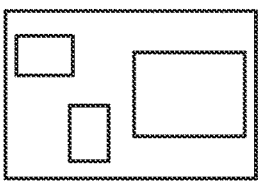
(1-3)   (2-3)   (3-3)   (4-3)
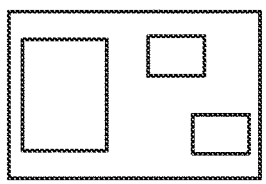 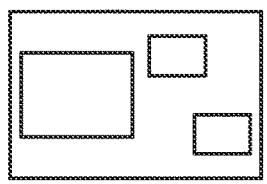 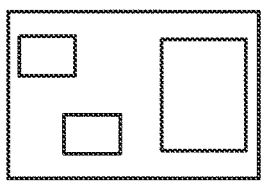 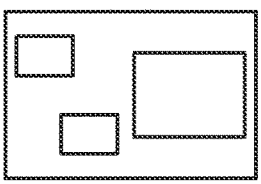
(1-4)   (2-4)   (3-4)   (4-4)
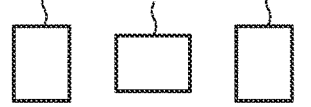
(A) DATE AND TIME

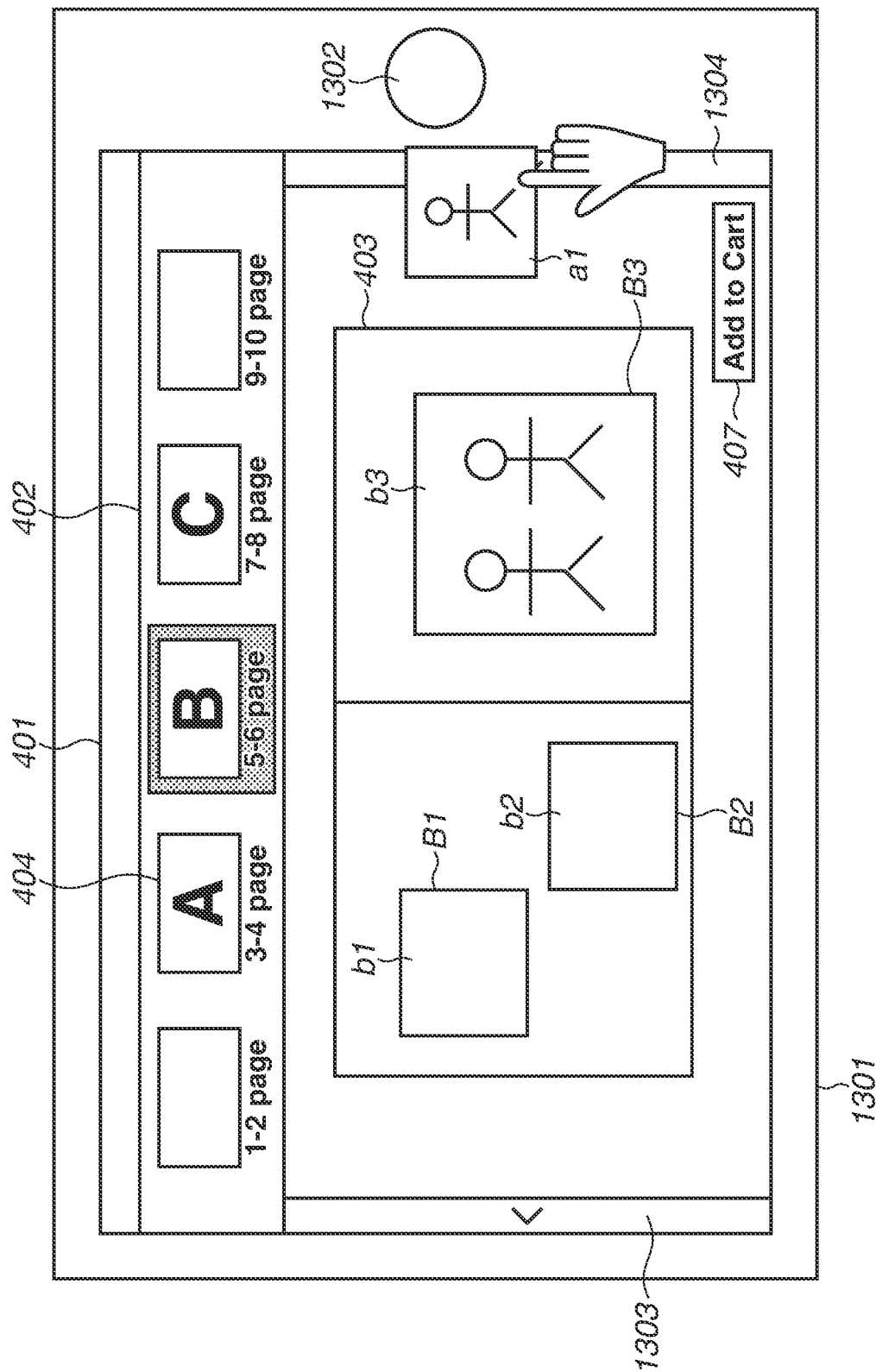

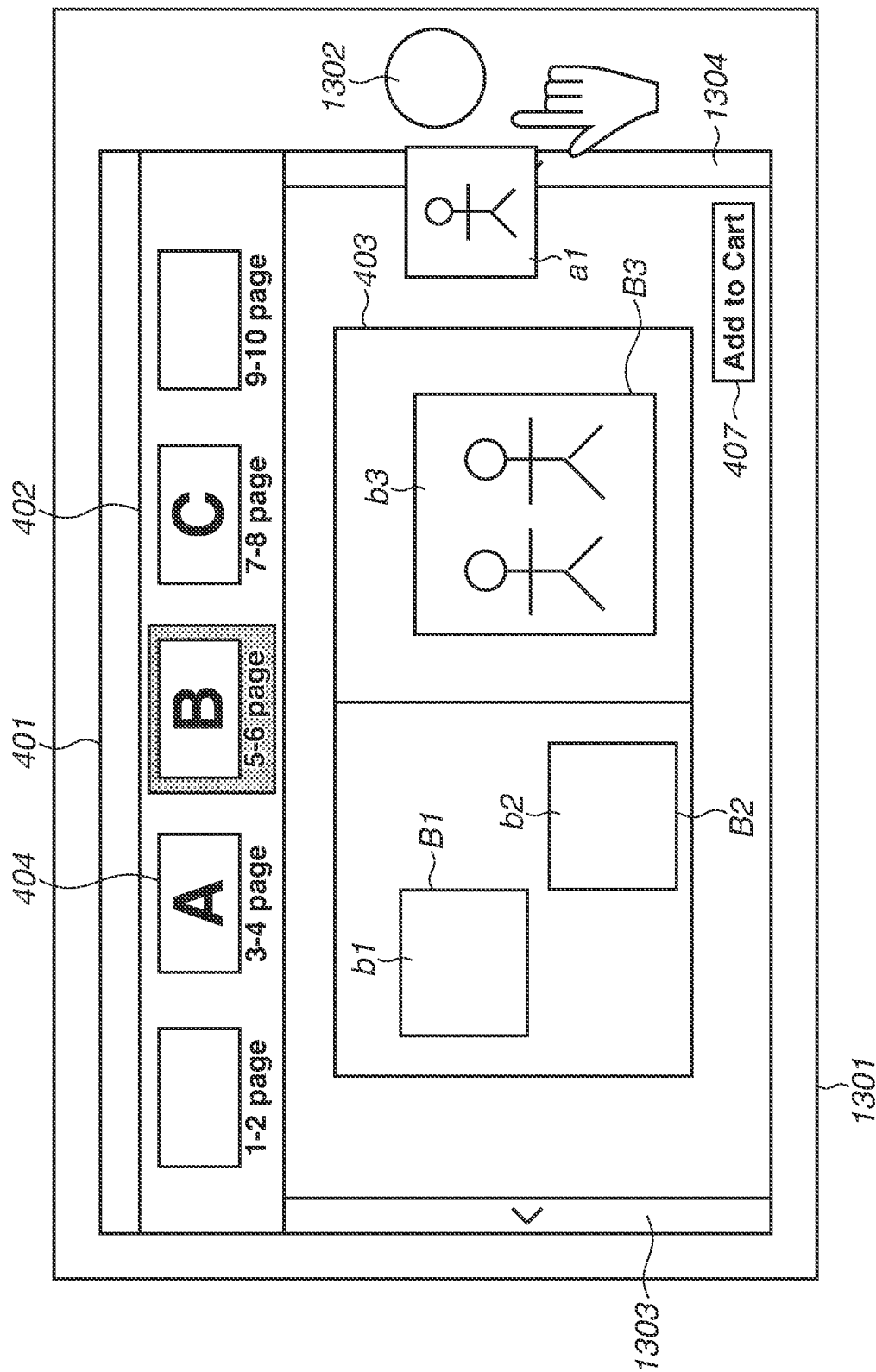

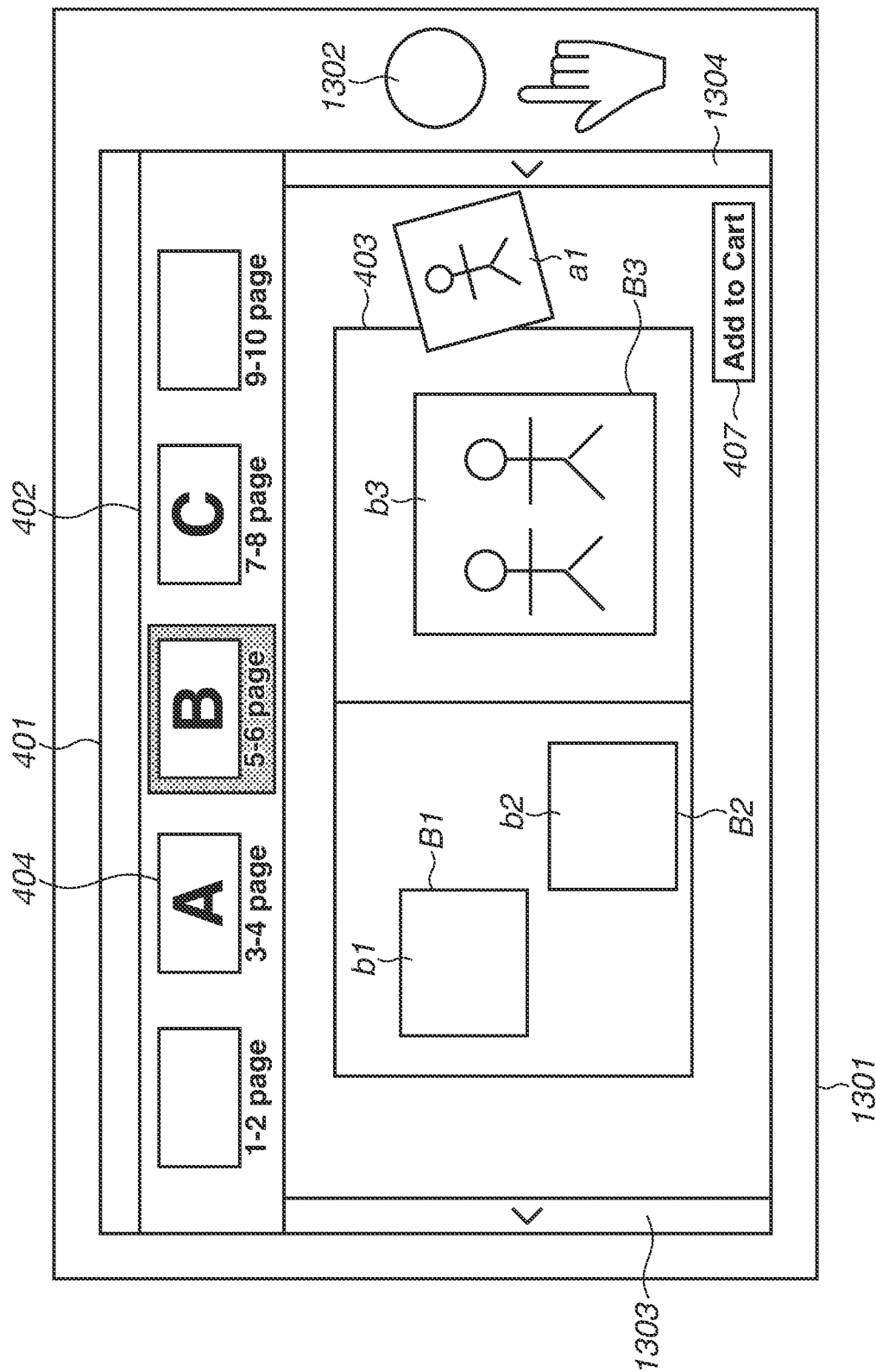

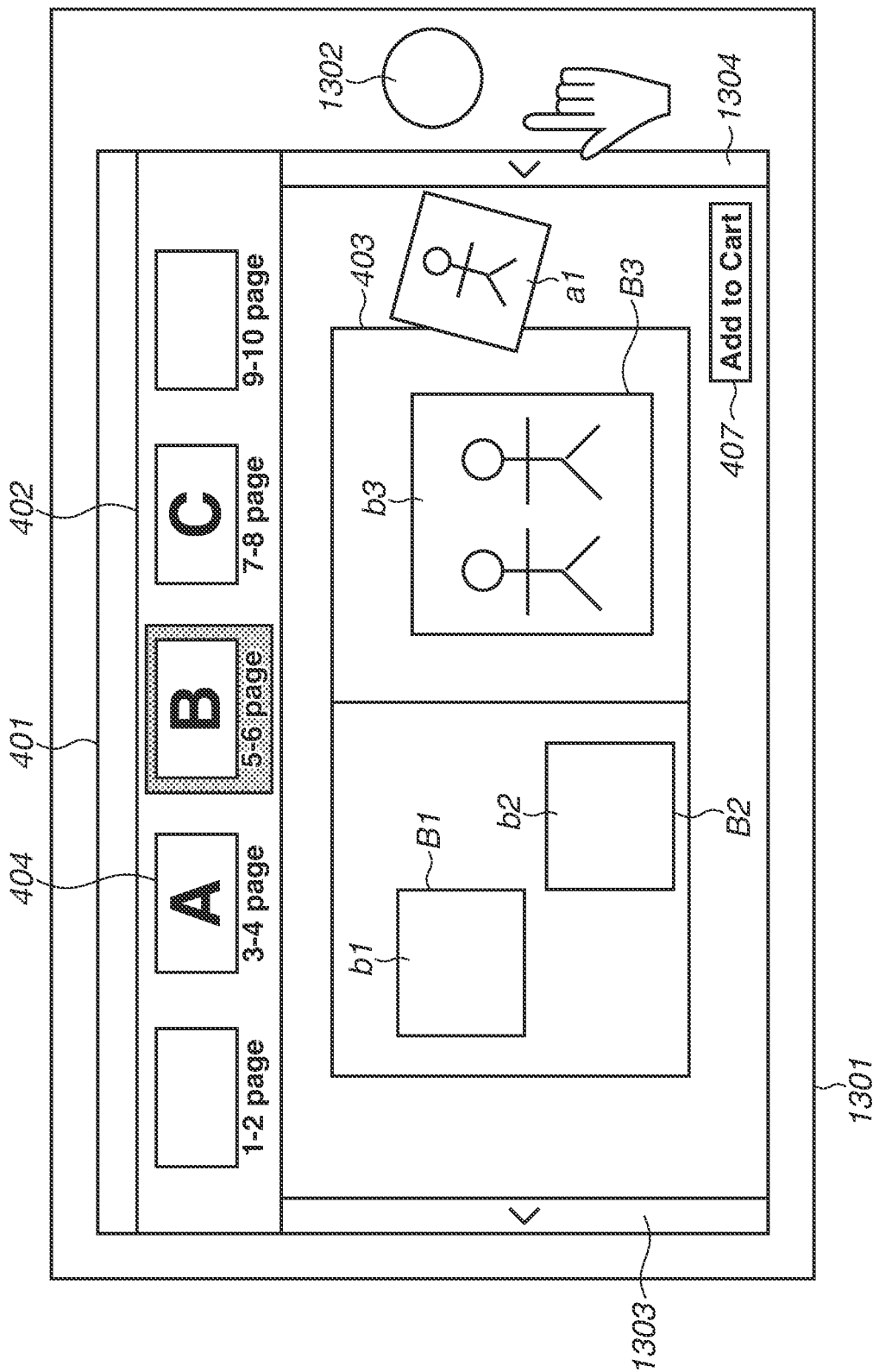

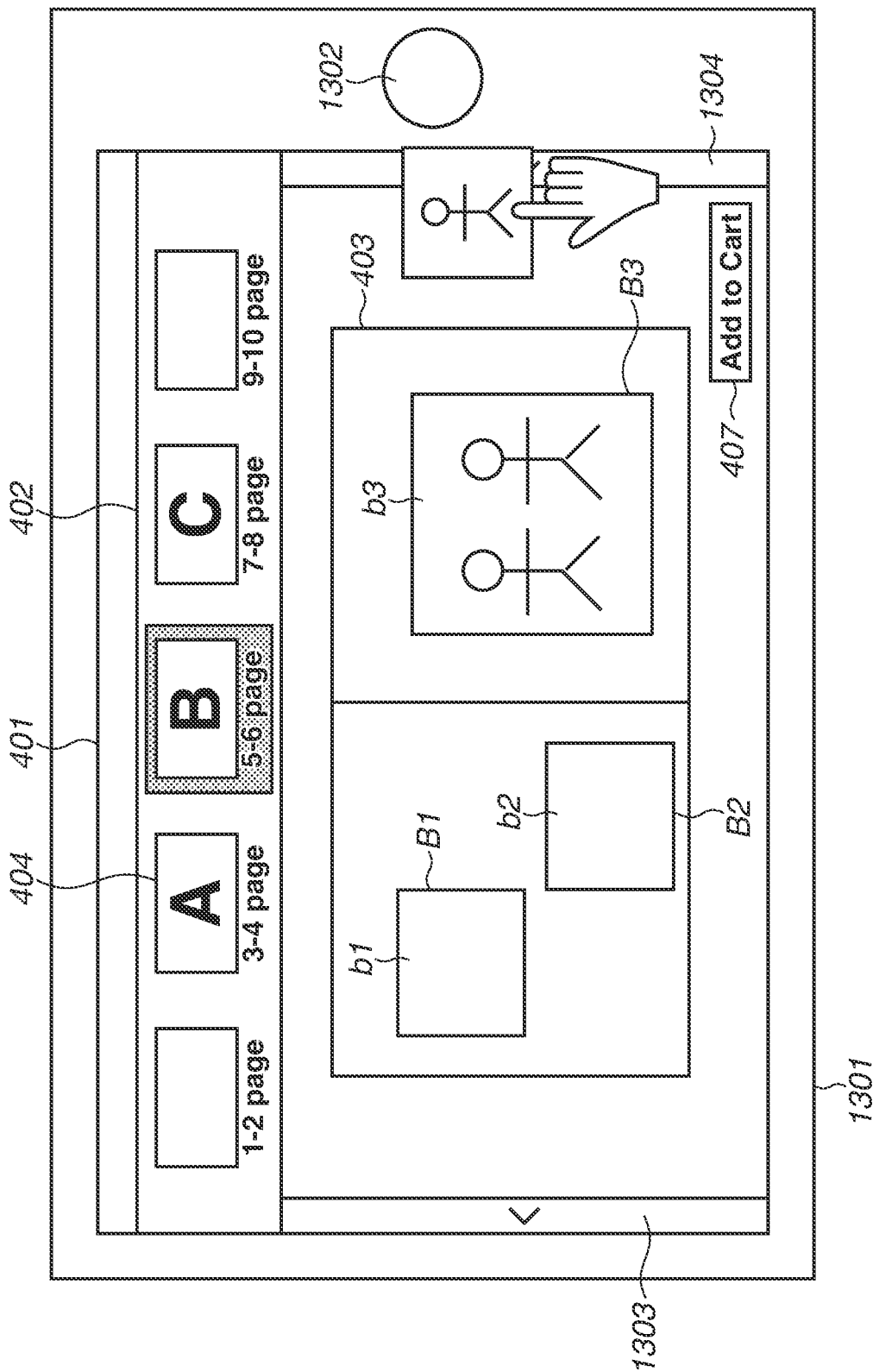

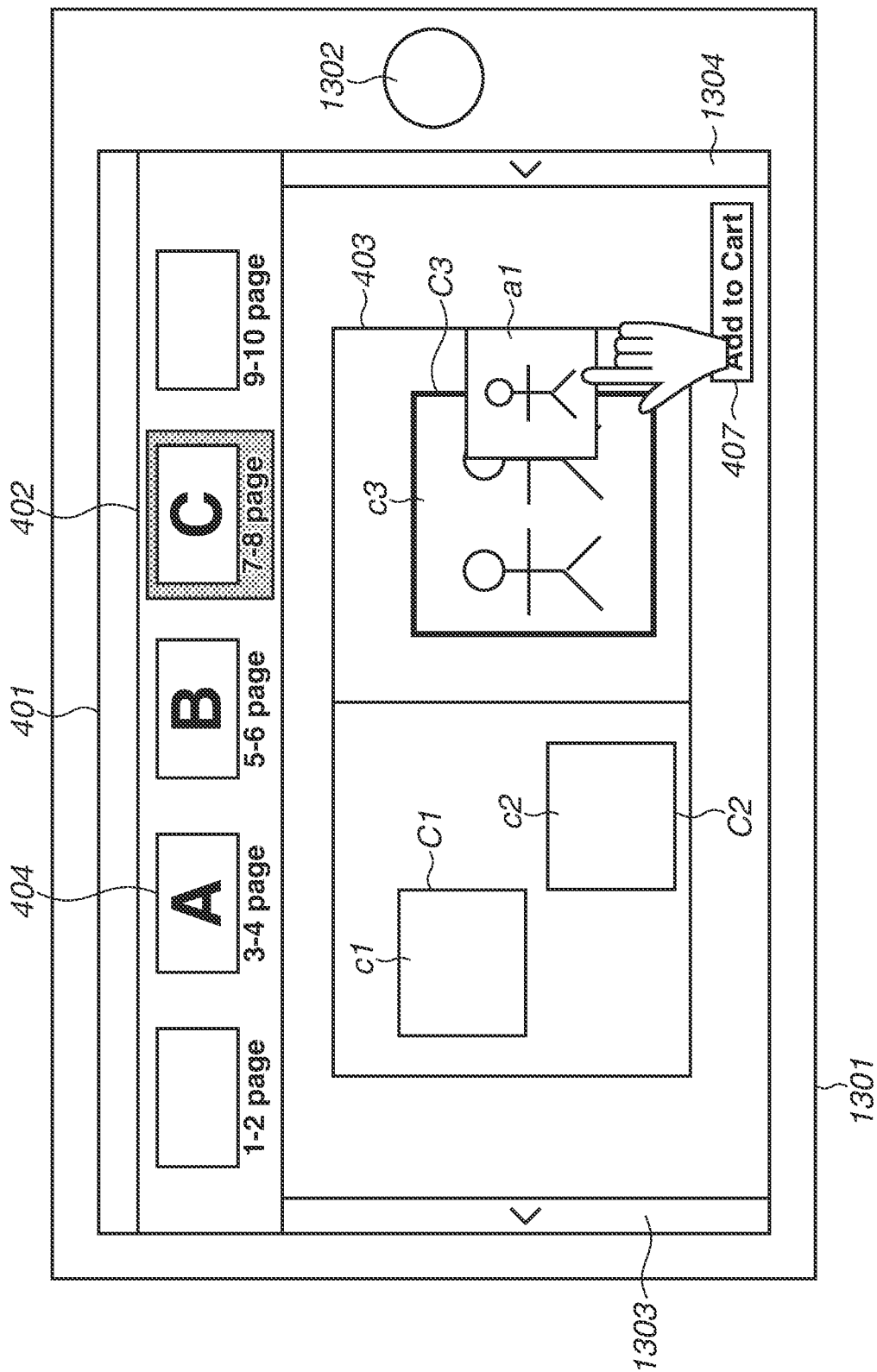

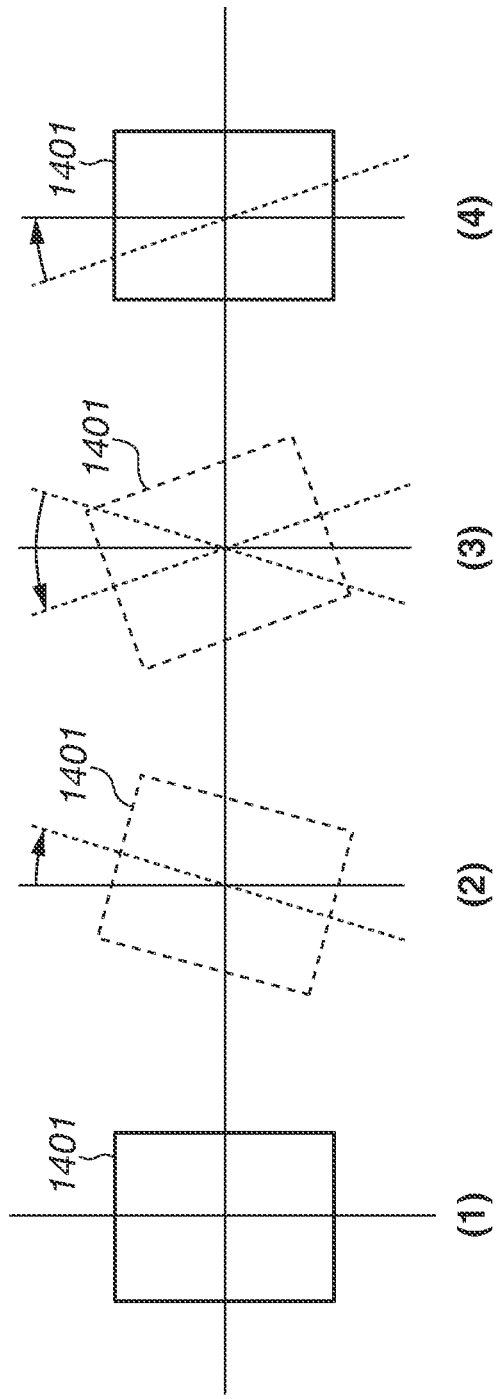

PAGE 1

PAGE 1

PAGE 1-2

PAGE 2

PAGE 2

PAGE 2

PAGE 2

PAGE 2

PAGE 2-3

PAGE 3

PAGE 3

PAGE 3

INFORMATION PROCESSING APPARATUS, DISPLAY CONTROL METHOD, AND PROGRAM

BACKGROUND

Field

Aspects of the present disclosure generally relate to an information processing apparatus, a display control method, and a program. In particular, they relate to a technique to perform display control of an item.

Description of the Related Art

In operations to be performed on a touch panel of, for example, a smartphone or a tablet terminal, there is a method of moving an item, such as an application icon, by dragging and dropping to a different page. In the case of this method, first, the user drags and moves the icon to the right or left end of a screen to turn pages in order. Then, when an intended page has been displayed, the user moves the icon away from the right or left end of the screen at that page and drops the icon there, thus relocating the icon to the intended page.

The user's finger can become un-detectable at the right or left end portion of the screen or the user's finger can inadvertently move outside the area of the touch panel, so that it can be recognized that the user's finger is removed from the item before switching of pages, and, therefore, the item can return to the previous position on the previous page. Japanese Patent Application Laid-Open No. 2016-115337 discusses a method in which, to address the determination of an unintended release of a user's finger, pages are switched as a result of any end portion of the item contacting a display frame regardless of the position of the user's finger.

The method discussed in Japanese Patent Application Laid-Open No. 2016-115337 enables increasing usability for the user to move the item between pages. However, in the method discussed in Japanese Patent Application Laid-Open No. 2016-115337, in a case where it is determined that the item is not in contact with the display frame, drop processing for the item is performed, so that the item is immediately relocated to the previous position taken before dragging or to a predetermined position in the same page. Therefore, the user cannot resume a drag operation before the item is relocated. This issue can commonly occur not only in a case where the item is moved between pages, but also in a case where the drag operation is released at the position unintended by the user in one page or at an area in which the item is unable to be allocated.

SUMMARY

According to an aspect of the present disclosure, an information processing apparatus that causes an item to be displayed in a display region of a display unit includes a first control unit configured to move an item placed at a predetermined placement region of a plurality of placement regions set in the display region based on a drag operation of a user, a second control unit configured to perform, in a case where the drag operation is released in an area other than the plurality of placement regions, cancel processing for placing the item in any placement region of the plurality of placement regions, and a third control unit configured to stop the cancel processing in a case where inputting to the display region by the user is received before the cancel processing performed by the second control unit is completed.

Further features of the present disclosure will become apparent from the following description of exemplary embodiments with reference to the attached drawings.

BRIEF DESCRIPTION OF THE DRAWINGS

FIG. 7 is a diagram illustrating image analysis information in the automatic layout processing.

FIG. 9 is a diagram illustrating scene classification in the automatic layout processing.

FIGS. 10A and 10B are diagrams illustrating image scoring in the automatic layout processing.

FIGS. 11A, 11B, 11C, 11D, 11E, 11F, 11G, 11H, and 11I are diagrams illustrating image selection in the automatic layout processing.

FIG. 12 is a diagram illustrating image layout in the automatic layout processing.

FIGS. 13A, 13B, 13C, 13D, 13E, 13F, 13G, 13H, and 13I are schematic diagrams illustrating a display control method.

FIG. 14 is a schematic diagram illustrating animation of an item.

DESCRIPTION OF THE EMBODIMENTS

Various exemplary embodiments, features, and aspects of the disclosure will be described in detail below with reference to the drawings. The following exemplary embodiments should not be construed to be limiting, and not all of combinations of features described in the exemplary embodiments are always essential for solutions provided by the disclosure.

Figure 1:
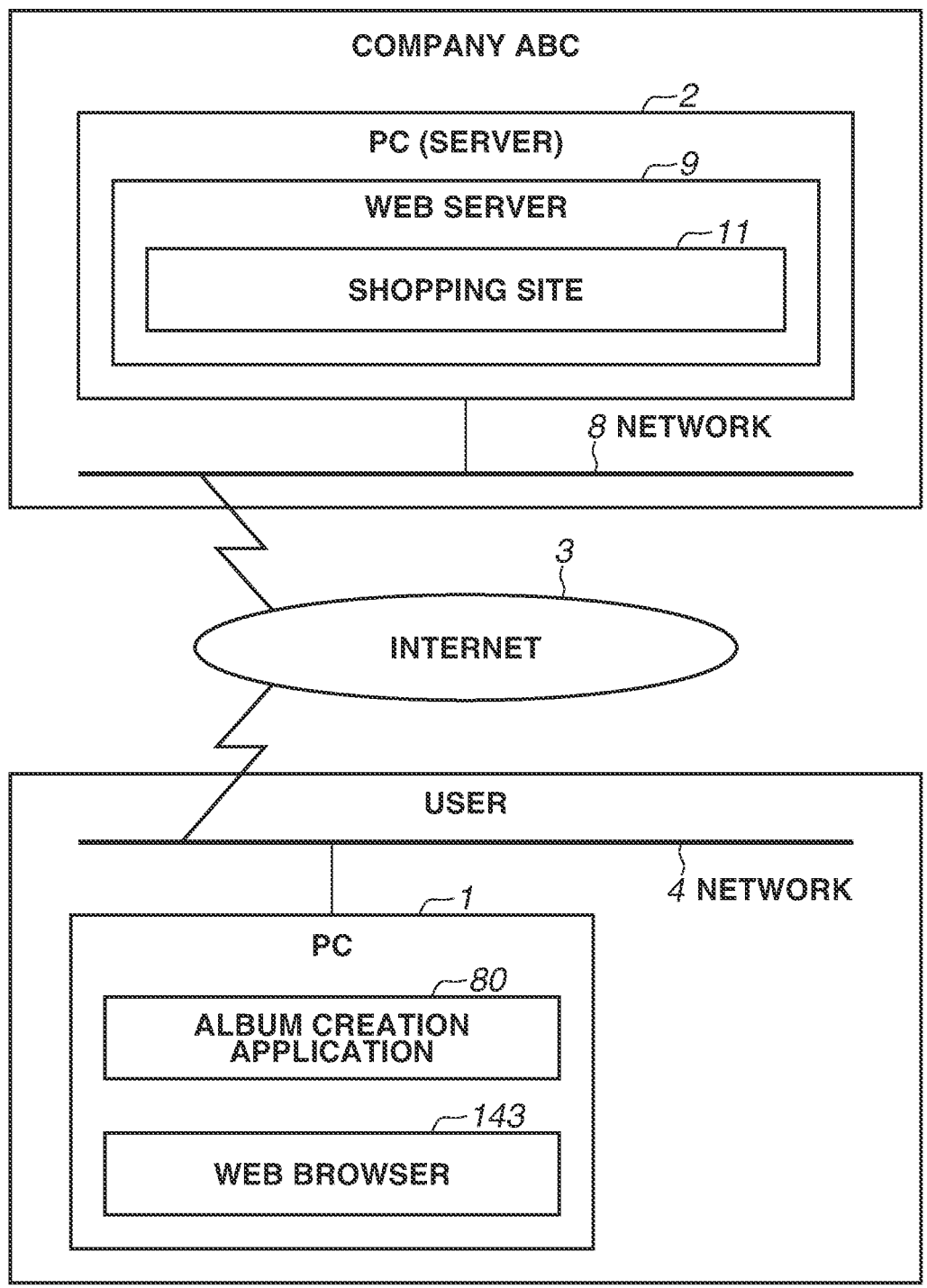
FIG. 1 is a diagram illustrating a configuration of a system including an information processing apparatus.

FIG. 1 is a diagram illustrating an example of a configuration of an information processing system for photo album creation/order according to a first exemplary embodiment. As illustrated in FIG. 1, the information processing system includes an information processing apparatus 1, which is used by the user, and an information processing apparatus 2, which belongs to a company that creates photo albums, and the information processing apparatus 1 and the information processing apparatus 2 are interconnected via the Internet 3. The information processing apparatus 1 includes, for example, a personal computer (PC). The information processing apparatus 2 is, for example, a server PC. For example, the information processing apparatus 1 and the information processing apparatus 2 have, installed thereon, operating systems (hereinafter also abbreviated as "OSs") equivalent to Windows® 8 and Windows® server 2012. The information processing apparatus 1 and the information processing apparatus 2 are respectively connected to networks 4 and 8 configured with Ethernet.

The information processing apparatus 1 has an application 80 for photo album creation (hereinafter also referred to as an "album application") installed thereon. The application is configured with, for example, a file of the executable format (*.EXE) for Windows®. Moreover, the information processing apparatus 1 has a web browser application 143 (hereinafter also referred to as a "web browser") installed thereon. The web browser 143 is a browser that is used to utilize World Wide Web (WWW). The network 4 is a network for the user who uses the information processing apparatus 1, and includes, for example, a home network for standard home.

The information processing apparatus 2 includes a web server 9 having the web server function, and, for example, provides a web site of a predetermined company (for example, assumed to be company ABC) via the Internet 3. A shopping site 11 is a shopping site in which company ABC provides a service for users, and the user can order a photo album using the shopping site 11.

Figure 2:
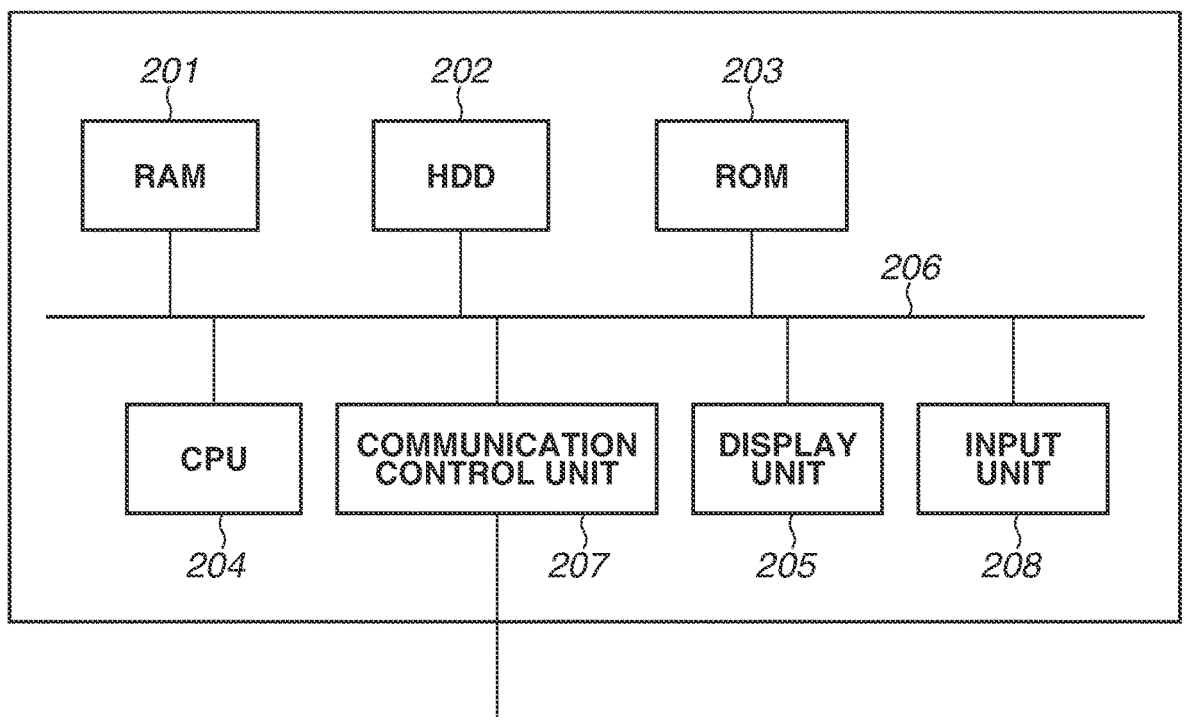
FIG. 2 is a diagram illustrating a hardware configuration of the information processing apparatus.

FIG. 2 is a diagram illustrating an example of a hardware configuration of the information processing apparatus 1. Furthermore, the information processing apparatus 2 is also assumed to have a similar configuration. However, the information processing apparatus 1 and the information processing apparatus 2 do not need to have the same configuration. As illustrated in FIG. 2, the information processing apparatus includes a central processing unit (CPU) 204, a random access memory (RAM) 201, a read-only memory (ROM) 203, a hard disk drive (HDD) 202, a display unit 205, an input unit 208, and a communication control unit 207, and they are interconnected via a system bus 206.

The CPU (processor) 204, which is a system control unit, controls the entire information processing apparatus 1. Moreover, the CPU 204 performs a display control method, which is described in the present exemplary embodiment, according to a program.

The RAM 201, which is a random access memory, provides a memory which temporarily stores various pieces of information when the program is executed by the CPU 204. The program to be executed by the CPU 204 is stored in the ROM 203.

The HDD 202 is a storage medium for storing, for example, image files and a database which retains processing results of, for example, image analysis. The HDD 202 stores applications, such as the album application 80 and the web browser 143, and various modules (software) to be described with reference to FIG. 3, which are loaded onto the RAM 201 as needed and then executed by the CPU 204. With this, the CPU 204 implements the functions of the applications, such as the application 80 and the web browser 143, and various modules (software) illustrated in FIG. 3.

The display unit 205 displays a user interface (UI) in the present exemplary embodiment and an image layout result to the user. The display unit 205 can have the touch sensor function. The input unit 208 is used for the user to perform various operations, and is used to, for example, input predetermined information onto a UI displayed on the display unit 205.

The communication control unit 207 is a device used to communicate with an external apparatus, such as a printer or a server. For example, album data generated by performing automatic layout is transmitted to the information processing apparatus 2 via the communication control unit 207.

Figure 3:
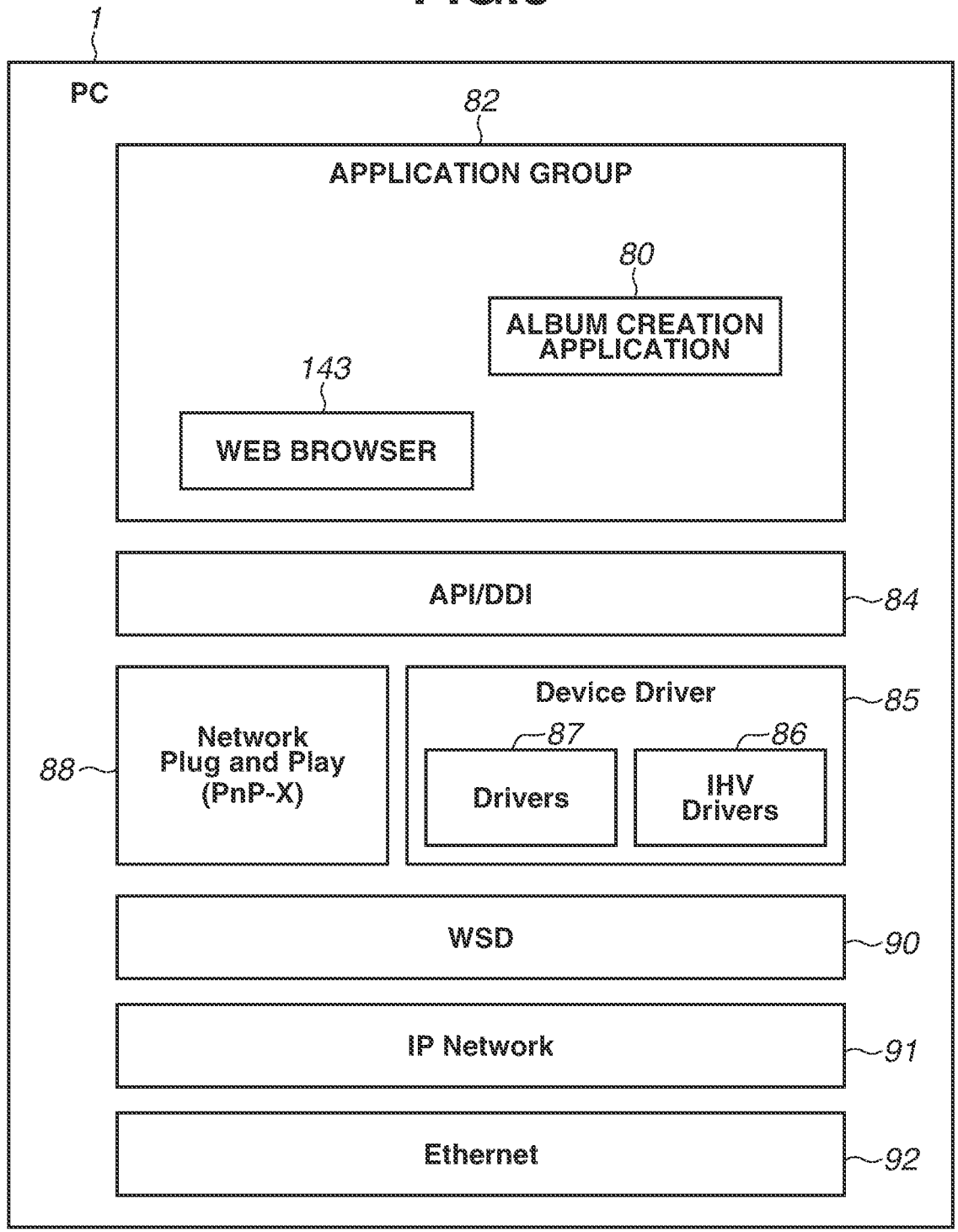
FIG. 3 is a diagram illustrating a software configuration of the information processing apparatus.

FIG. 3 is a diagram illustrating a configuration of a software module group stored in the HDD 202 of the information processing apparatus 1. Software modules illustrated in FIG. 3 are only a part of the software module group stored in the HDD 202 and do not include all of that. Furthermore, the software module group stored in the HDD 202 can be changed as appropriate according to an OS installed on the information processing apparatus 1 or the usage environment of the information processing apparatus 1.

A module 92 is an Ethernet control stack for controlling Ethernet. A module 91 is an IP network control stack for controlling an Internet Protocol (IP) network. A module 90 is a WSD control stack for controlling Web Services on Devices (WSD), which provides the contrivance for device discovery on a network. A module 88 is a PnP-X control stack for controlling Plug and Play for a network. Furthermore, PnP-X is an abbreviation for Plug and Play Extensions, which is a standard function included in Windows 8® as a series of extension functions of Plug and Play. A module 85 is a device driver group, and is configured to include a standard driver group 87, which is included in the OS as standard, and an IHV-made driver group 86 provided by an independent hardware vendor (IHV).

A module 84 is an application/DDI interface, and is configured to include an application programming interface (API) and a device driver interface (DDI). An application group 82 is an application group including the application 80 and the web browser 143.

Figure 4:
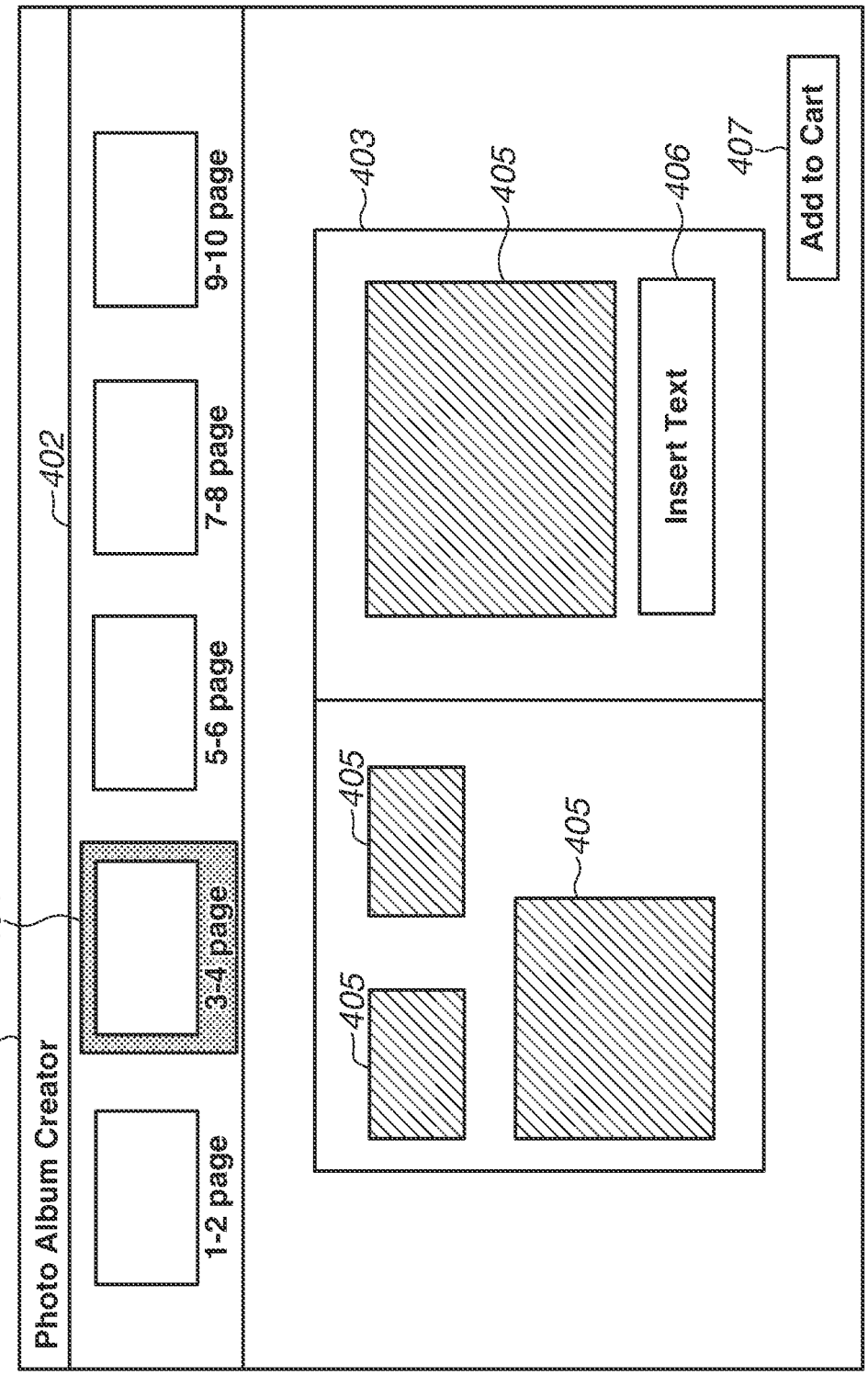
FIG. 4 is a schematic diagram illustrating a screen which is provided by an album creation application.

FIG. 4 illustrates a display screen provided by the CPU 204 executing the photo album application, which is also an example of an editing screen used to edit a photo album. The editing screen 401 is provided by the photo album application. A display region 402 is a region in which to display thumbnails of the respective pages of a photo album in a list-like manner. A display region 403 is a region in which to display a preview image of the page selected in the display region 402, and is available for editing a layout image.

When the user selects an intended thumbnail from among the thumbnails of the respective pages displayed in the display region 402, the selected page becomes a display 404 that is in a selected state. In FIG. 4, two pages (one double-page spread), i.e., pages 3 to 4, are in a selected state, and layout images of these pages are displayed in the display region 403. Furthermore, for example, a double-page spread corresponds to one display window with regard to displaying, and corresponds to a pair of printed pages adjacent to each other with regard to printing.

The display region 403 is available for an operation for editing a photo album. A template displayed in a layout image includes one or more slots. In FIG. 4, the template on the third page (the left-hand side page in FIG. 4) includes three slots 405, and the template on the fourth page (the right-hand side page in FIG. 4) includes one slot 405. The slots 405 are slots to which respective photographs are allocated. Furthermore, in the present exemplary embodiment, photographs are automatically allocated to the respective slots 405. A text box 406 enables the user to input optional text thereto.

A button 407 is used to place a photo album generated (edited) by the application in a cart. Pressing the button 407 causes the edited photo album to be uploaded to a shopping cart in the information processing apparatus 2 via the Internet 3.

<Configuration of Automatic Layout Processing Unit>

Figure 5:
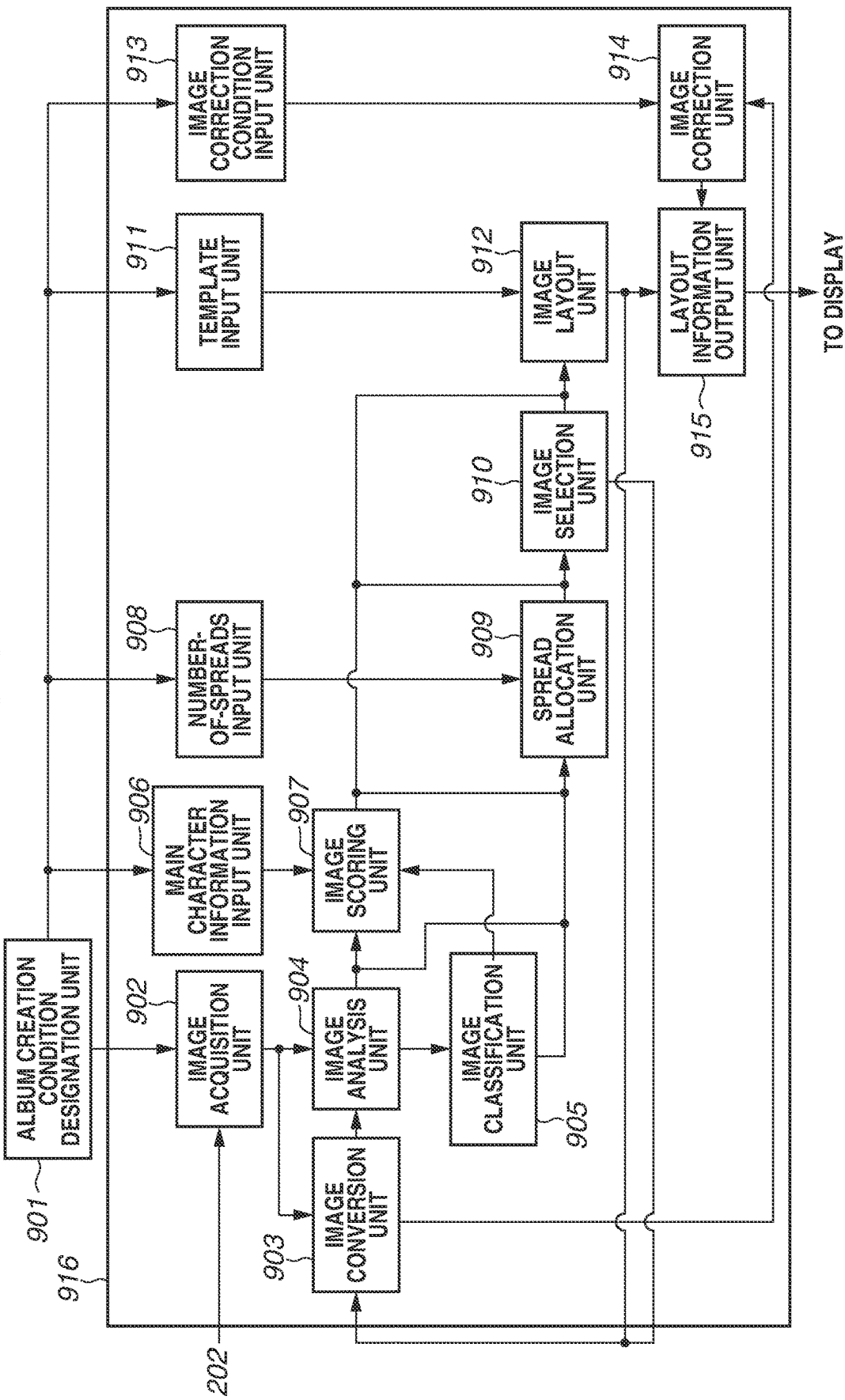
FIG. 5 is a diagram illustrating an automatic layout processing unit of the album creation application.

FIG. 5 is a software block diagram of some functions of the album creation application. While the album creation application has various functions, in the present exemplary embodiment, an automatic layout function which is provided by an automatic layout processing unit 916 is particularly described. The automatic layout function is a function to classify or select taken photographs based on the contents or attributes thereof, lay out the photographs, and generate an album image to be displayed on the display unit 205.

In the present exemplary embodiment, the album creation application is activated by an icon of the application displayed on the display unit 205 being pressed by the user. As illustrated in FIG. 5, the album creation application includes an album creation condition designation unit 901 and an automatic layout processing unit 916. The album creation condition designation unit 901 designates an album creation condition with respect to the automatic layout processing unit 916 according to a user interface (UI) operation performed via the input unit 208, such as a mouse.

An image acquisition unit 902 acquires an image group designated by the album creation condition designation unit 901 from the HDD 202. The term "image group" as used herein refers to a candidate image group to be laid out to create one album. For example, in a case where "Jan. 1, 20XX to Dec. 31, 20XX" is designated in the album creation condition designation unit 901, all of the images captured during a period from Jan. 1, 20XX to Dec. 31, 20XX correspond to a designated image group.

An image conversion unit 903 converts image data, which is to be used in subsequent processing, into image data having an intended number of pixels or intended color information. In the present exemplary embodiment, the image conversion unit 903 converts the image data into an analysis image the number of pixels of which is the number of pixels in the short side and the color information of which is sRGB.

An image analysis unit 904 performs processing for feature amount acquisition, face detection, facial expression recognition, and personal recognition, which are described below, from the analysis image. Moreover, the image analysis unit 904 acquires image capturing date and time information from data, for example, Exif information, attached to an image acquired from the HDD 202.

An image classification unit 905 performs, on an image group, scene segmentation and scene classification, which are described below, using the image capturing date and time information, the number of captured images, and the detected face information. The term "scene" refers to an image capturing scene such as "travel", "daily life", and "wedding ceremony". The scene can be said to be, for example, an aggregation of images captured in an image capturing opportunity at a certain period of time.

A main character information input unit 906 inputs an ID (identification information) of a main character designated by the album creation condition designation unit 901 to an image scoring unit 907.

The image scoring unit 907 performs scoring on each image. In the present exemplary embodiment, the image scoring unit 907 performs scoring in such a manner that an image appropriate for layout gains a high score. To perform scoring in such a manner that an image appropriate for layout gains a high score, the image scoring unit 907 uses information acquired by the image analysis unit 904 and information acquired by the image classification unit 905. The image scoring unit 907 performs scoring on each image in such a manner that the score of an image in which the ID of a main character input by the main character information input unit 906 is contained becomes a high score.

A spread allocation unit 909 divides an image group into portions and allocates each portion to each spread. The term "spread" as used herein refers to, for example, a double-page spread obtained by album creation and corresponds to two pages.

A number-of-spreads input unit 908 inputs the number of spreads of an album designated by the album creation condition designation unit 904 to the spread allocation unit 909.

The spread allocation unit 909 divides an image group into portions according the input number of spreads and allocates each portion of the image group to each spread. For example, in a case where the number of spreads is 5, the spread allocation unit 909 divides the acquired image group into five small image groups and allocates one small image group to each spread.

An image selection unit 910 selects an image from portions of the image group allocated to the respective spreads by the spread allocation unit 909, based on scores given by the image scoring unit 907.

A template input unit 911 inputs a plurality of templates corresponding to template information designated by the album creation condition designation unit 901 to an image layout unit 912.

The image layout unit 912 determines the layout of images. More specifically, the image layout unit 912 selects a template suitable for an image selected by the image selection unit 910 from a plurality of templates input by the template input unit 911, and determines the layout (placement location) of each image.

An image correction condition input unit 913 inputs the turning-on/turning-off condition of image correction designated by the album creation condition designation unit 901 to an image correction unit 914.

The image correction unit 914 performs dodging correction, red-eye correction, and contrast correction. In a case where the image correction condition is set to turning-on, the image correction unit 914 performs correction to an image, and, in a case where the image correction condition is set to turning-off, the image correction unit 914 does not perform correction. Furthermore, the image correction unit 914 performs correction to an image input from the image conversion unit 903 according to turning-on/turning-off of image correction. The number of pixels of an image input from the image conversion unit 903 to the image correction unit 914 is configured to be able to be changed in conformity with the size of a layout determined by the image layout unit 912.

A layout information output unit 915 outputs layout information to be displayed on the display unit 205 according to the image layout determined by the image layout unit 912. The layout information is, for example, bit-mapped data in which the selected images are arranged in the selected template.

<Flow of Automatic Layout Processing>

Figure 6:
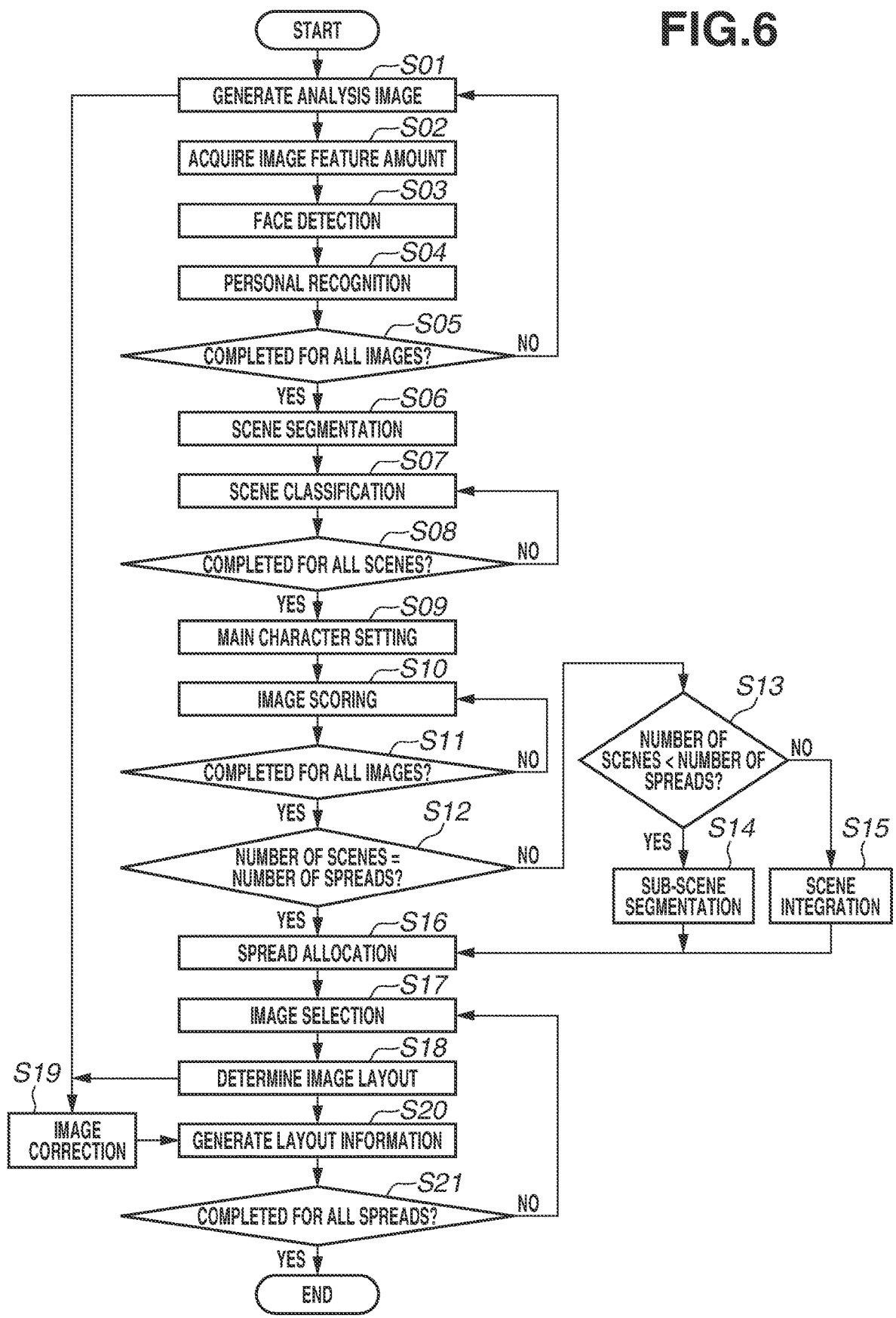
FIG. 6 is a flowchart illustrating the flow of automatic layout processing.

FIG. 6 is a flowchart illustrating a processing flow concerning the automatic layout processing unit 916 of the album creation application according to the present exemplary embodiment. For example, the flowchart illustrated in FIG. 6 is implemented by the CPU 204 loading a program stored in the HDD 202 onto the ROM 203 or the RAM 201 and executing the program. The processing flow for automatic layout is described as follows with reference to FIG. 6.

In step S01, the image conversion unit 903 generates an analysis image. The image conversion unit 903 converts each image of an image group stored in the HDD 202 and designated by the album creation condition designation unit 901 into an image having an intended number of pixels and intended color information. Furthermore, the number of pixels and color information into which conversion is performed here is previously determined and stored. In the present exemplary embodiment, the image conversion unit 903 performs conversion into an analysis image the number of pixels of which is the number of pixels in the short side and the color information of which is sRGB.

In step S02, the image analysis unit 904 acquires an image feature amount. The image analysis unit 904 acquires image capturing date and time from, for example, Exif information attached to each image data acquired from the HDD 202. Moreover, the image analysis unit 904 acquires a feature amount from the analysis image generated in step S01. Examples of the feature amount include focus. Examples of the method for detecting an edge to acquire the feature amount concerning focus include using a commonly-used Sobel filter. The gradient of an edge can be calculated by detecting the edge via the Sobel filter and dividing a luminance difference between the starting point and end point of the edge by a distance between the starting point and end point thereof. The result obtained by calculating an average gradient of edges in the image enables deeming an image with a large average gradient to be more in focus than an image with a small average gradient. Then, setting a plurality of threshold values different from each other with respect to the gradient enables outputting an evaluation value of the amount of focusing by determining which threshold value the gradient is equal to or greater than. In the present exemplary embodiment, two different threshold values are previously set, and the amount of focusing is determined in three levels of "○", "Δ", and "×". The threshold values are previously set, for example, through experiment in such a manner that the gradient of focus desired to be employed for an album is set to level "○", the allowable gradient of focus is set to level "Δ", and the unallowable gradient of focus is set to level "×".

In step S03, the image analysis unit 904 performs face detection. The image analysis unit 904 detects a face from the analysis image generated in step S01. A known method can be used for face detection, and, for example, AdaBoost, in which a strong classifier is generated from a plurality of previously-prepared weak classifiers, is used. In the present exemplary embodiment, the face of a person (object) is detected by a strong classifier generated according to AdaBoost. Moreover, the image analysis unit 904 not only extracts the face image but also acquires the upper left coordinate values and lower right coordinate values of the position of the detected face. Furthermore, the term "image" as used herein refers to an image represented by image data generated in step S01. Specifying such two types of coordinates enables the image analysis unit 904 to identify the position of the face of the person and the size of the face. Furthermore, while, in the present exemplary embodiment, the face of a person is assumed to be detected, the image analysis unit 904 can generate a strong classifier according to AdaBoost with not only the face of a person but also another object, such as an animal, for example, a dog or cat, a flower, food, a building, or a stationary article, used as a detection target instead of the face. Thus, the image analysis unit 904 can be configured to detect objects other than faces.

In step S04, the image analysis unit 904 performs personal recognition. First, the image analysis unit 904 makes a comparison in similarity between the face image extracted in step S03 and a representative face image stored for each personal ID in a face dictionary database. Then, the image analysis unit 904 sets the ID of a representative face image with the similarity equal to or greater than a threshold value and with the highest similarity as the ID of the extracted face image. Furthermore, in a case where the similarity is less than the threshold value, the image analysis unit 904 assigns a new personal ID to the extracted face image and registers the extracted face image as a new face with the face dictionary database.

Image analysis information acquired in steps S02 to S04 is stored distinctively for each ID for identifying each image, as illustrated in FIG. 7. Image capturing date and time information and a focus determination result acquired in step S02 and the number of faces and position information thereof detected in step S03 are stored. Furthermore, the position information about a face is separately stored for each personal ID acquired in step S04. In a case where no face is detected in image data, image capturing date and time information and a focus determination result acquired in step S02 are stored.

In step S05, the CPU 204 determines whether processing in steps S01 to S04 has been completed with respect to all of the images of the image group stored in the HDD 202 and designated by the album creation condition designation unit 901. If it is determined that the processing has not yet been completed (NO in step S05), the processing returns to step S01. If it is determined that the processing has been completed (YES in step S05), the processing proceeds to step S06.

Figure 8A:
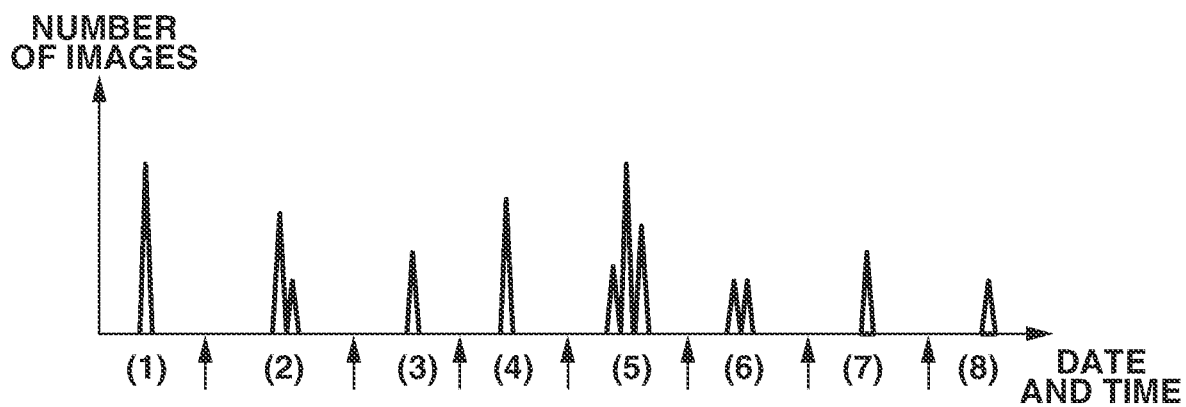
FIGS. 8A, 8B, and 8C are diagrams illustrating image group division in the automatic layout processing.

In step S06, the image classification unit 905 performs scene segmentation. The scene segmentation refers to segmenting the acquired image group into a plurality of sub-image groups by scenes. More specifically, the image classification unit 905 segments the image group into a plurality of sub-image groups based on time differences between images calculated from the image capturing date and time information acquired in step S02. In a case where image capturing dates of respective images are not consecutive, in other words, a day on which no image capturing is performed is present between images, scene segmentation is performed. Next, a case in which image capturing dates are consecutive is described. In the present exemplary embodiment, in a case where a difference in image capturing time between images is 16 hours or more, scene segmentation is performed. In a case where a difference in image capturing time between images is less than 16 hours, scene segmentation is performed if a time difference from the first image capturing to the last image capturing of each of consecutive days is less than 4 hours. In the present exemplary embodiment, in a case where the time difference is 4 hours or more, scene segmentation is performed if the number of captured images in each of consecutive days is less than 50, and scene segmentation is not performed if the number of captured images is 50 or more. Furthermore, the threshold value for the time difference or the threshold value for the number of captured images for scene segmentation are not limited the above values. FIG. 8A illustrates a result of segmentation performed according to the above-mentioned scene segmentation method.

In step S07, the image classification unit 905 performs scene classification. While, in the present exemplary embodiment, an example in which each sub-image group (each scene) is classified into any one of three scenes, i.e., "travel", "daily life", and "ceremony", is described, scene classification is not limited to this. First, a plurality of sub-image groups previously determined to be classified into any one of "travel", "daily life", and "ceremony" is acquired. A feature amount for image capturing is acquired with respect to each image group. Examples of the feature amounts acquired in the present exemplary embodiment include an image capturing period, the number of captured images, and the number of persons subjected to image capturing. The image capturing period is a time difference between the first image capturing and the last image capturing in an image group. The number of captured images is the number of images (the number of photographs) included in a sub-image group. The number of persons subjected to image capturing is the number of faces contained in an image having faces contained therein. In other words, the number of persons subjected to image capturing is the number of faces contained in one image. Then, the image classification unit 905 obtains an average value and a standard deviation of the image capturing period, an average value and a standard deviation of the number of captured images, and an average value and a standard deviation of the number of persons subjected to image capturing per one image with respect to a plurality of sub-image groups. Furthermore, in the present exemplary embodiment, the number of faces per one image is assumed to be the number of persons per one image. FIG. 9 illustrates respective average values and standard deviations of the image capturing period (hours), the number of captured images (images), and the number of persons subjected to image capturing (persons). These obtained values are previously incorporated in the program of the album creation application. After the album creation application is activated, the CPU 204 calculates the average values of the image capturing period, the number of captured images, and the number of persons subjected to image capturing with respect to each sub-image group obtained by performing scene segmentation in step S06 on an image group designated by the user via a path box (not illustrated). Then, the CPU 204 performs scoring about the feature amounts of the image capturing period, the number of captured images, and the number of persons subjected to image capturing of each sub-image group with respect to each scene based on the respective average values and standard deviations, according to the following formulae.

The score=50−|10×(the average value−the feature amount)/the standard deviation|     (1)

The average score=(the score of the image capturing period+the score of the number of captured images+the score of the number of persons)/the number of feature amount items     (2)

In the above-described way, the respective average scores for "travel", "daily life", and "ceremony" are calculated. The CPU 204 classifies a scene with the highest score in each sub-image group as the scene of the corresponding sub-image group. In a case where two or more scenes have the same score, the CPU 204 classifies a sub-image group as any one of the scenes with the same score according to predetermined ordering of preference. For example, in the present exemplary embodiment, the ordering of preference is assumed to be the order of "daily life">"ceremony">"travel", so that "daily life" is set highest in preference.

A sub-image group (5) obtained by scene segmentation illustrated in FIG. 8A is assumed to have the image capturing period being 36 hours, the number of captured images being 300, and the number of persons subjected to image capturing being 1.7. Then, the average score of "travel" becomes 45.32, the average score of "daily life" becomes 18.38, and the average score of "ceremony" becomes −29.92, so that the scene is classified as "travel". The classified scene is managed with a scene ID in a discriminable manner.

In step S08, the CPU 204 determines whether scene classification in step S07 has been completed with respect to all of the sub-image groups acquired in step S06. If it is determined that the scene classification has not yet been completed (NO in step S08), the processing returns to step S07. If it is determined that the scene classification has been completed (YES in step S08), the processing proceeds to step S09.

In step S09, the image scoring unit 907 performs main character setting. The main character setting is executed with respect to an image group designated by the user, and is performed according to any one of two, automatic and manual, types of setting methods. In the case of the automatic main character setting method, the image scoring unit 907 performs main character setting based on a result of personal recognition in step S04 and a result of scene segmentation in step S06. The image scoring unit 907 specifies, for example, the number of times of appearance of each personal ID in a sub-image group, the number of times of appearance of each personal ID in each scene, and the number of times of scenes in which each personal ID appears based on a result acquired in step S04, and automatically sets a main character based on these pieces of information. In the present exemplary embodiment, in a case where a sub-image group includes a plurality of scenes, the image scoring unit 907 sets, as a main character ID, a personal ID with the large number of times of appearance in the plurality of scenes, and, in a case where a sub-image group is a single scene, the image scoring unit 907 sets, as a main character ID, a personal ID with the large number of times of appearance in the single scene. Moreover, in a case where the user designates a specific icon via the main character information input unit 906, a personal ID corresponding to the icon selected via the main character information input unit 906 is transmitted to the image scoring unit 907. In a case where there is a personal ID designated by the user, the main character ID automatically set in the above-mentioned manner is neglected, and the image scoring unit 907 sets the personal ID designated by the user as a main character ID. Such setting that is based on the designation performed via the main character information input unit 906 is referred to as "manual setting".

In step S10, the image scoring unit 907 performs scoring. The scoring refers to assigning a score evaluated from a viewpoint described below for each piece of image data, which is referred to at the time of image selection described below.

FIG. 12 illustrates a template group for use in layout of three images. A template 1601 illustrated in part (1-1) of FIG. 12 is a single template and contains a main slot 1602, a sub-slot 1603, and a sub-slot 1604. The main slot 1602 is a principal slot in the template 1601 (a frame in which an image is laid out), and is larger in size than the sub-slot 1603 and the sub-slot 1604. Furthermore, sub-slots are slots other than a main slot in each template. Both a score for the main slot and scores for the sub-slots are assigned to each piece of image data. In scoring processing, both a score for the main slot and scores for the sub-slots are assigned to each image.

Next, FIG. 10A illustrates a criterion for scoring of image data. FIG. 10A is a table in which features of images assigned with high scores that are respectively employed in a main slot and a sub-slot are summarized for each of the types of scenes, "travel", "daily life", and "ceremony". Furthermore, as illustrated in FIG. 10A, features getting high scores differ according to the respective types of slots. For example, in a case where the scene type of a sub-image group is "travel", a zoomed-out image containing a person and a landscape is assigned a high score for a main slot, and an image containing the close-up of a face or the profile of a person is assigned a high score for a sub-slot. For example, in a case where the scene type of a sub-image group is "daily life", an image containing the close-up of a face or the profile of a person is assigned a high score for a main slot, and a zoomed-out image containing a person and a landscape is assigned a high score for a sub-slot. For example, in a case where the scene type of a sub-image group is "ceremony", an image containing two persons close in distance is assigned a high score for a main slot, and an image containing a large number of persons is assigned a high score for a sub-slot. In this way, features assigned with high scores, in other words, evaluation criteria, differ according to the types of scenes and slots. In the present exemplary embodiment, features assigned with high scores corresponding to the types of scenes and slots are assumed to be previously set and to be included in the program. Furthermore, features assigned with high scores are not limited to the above-mentioned ones. The CPU 204 assigns scores to respective pieces of image data included in each sub-image group based on the respective features of a main slot and a sub-slot of each scene illustrated in FIG. 10A. The CPU 204 previously acquires the number of faces in each image, the position of each face in each image, and the size of each face in each image, calculates an average value and a standard deviation thereof with respect to each scene and each slot type (main slot and sub-slot), and stores them in the program of the album creation application. The CPU 204 determines to which scene an image represented by each piece of image data of an image group designated by the user belongs (is classified), based on a result of scene classification performed in step S07. Then, the CPU 204 calculates a score and an average score using the following formulae based on the previously-calculated average value and standard deviation corresponding to a scene of an attention image and the feature amounts of the number of faces of the main character ID, the position of each face, and the size of each face in the attention image.

The score=50−|10×(the average value−the feature amount)/the standard deviation|

The average score=(the score of the number of faces+the score of the position of each face+the score of the size of each face)/the number of feature amount items Furthermore, scoring is performed for both a main slot and a sub-slot. Moreover, with regard to images to be used for an album, an increased score can be assigned to an image of the image ID the feature amount of focus illustrated in FIG. 7 of which is set to level "∘". This enables increasing the score of an image that is in in-focus state. FIG. 10B illustrates an example of scoring performed on each image, in which scores for a main slot and a sub-slot are assigned to each image ID.

In step S11, the image scoring unit 907 determines whether the image scoring in step S10 has been completed with respect to all of the images of the image group designated by the user. If it is determined that the image scoring has not yet been completed (NO in step S11), the processing returns to step S10. If it is determined that the image scoring has been completed (YES in step S11), the processing proceeds to step S12.

In step S12, the spread allocation unit 909 determines whether the number of scenes (the number of sub-image groups) acquired by scene segmentation performed by the image classification unit 905 is equal to the number of spreads input by the number-of-spreads input unit 908. If it is determined that the number of scenes is not equal to the number of spreads (NO in step S12), the processing proceeds to step S13. If it is determined that the number of scenes is equal to the number of spreads (YES in step S12), the processing proceeds to step S16. For example, if the number of scenes acquired by scene segmentation is 8 as illustrated in FIG. 8A and the numeral entered in the number-of-spreads input unit 908 is 8, the processing proceeds to step S16.

In step S13, the spread allocation unit 909 determines whether the number of scenes acquired by scene segmentation performed by the image classification unit 905 is less than the number of spreads input by the number-of-spreads input unit 908. If it is determined that the number of scenes is not less than the number of spreads (NO in step S13), the processing proceeds to step S15. If it is determined that the number of scenes is less than the number of spreads (YES in step S13), the processing proceeds to step S14. For example, if the number of scenes acquired by scene segmentation is 8 as illustrated in FIG. 8A and the numeral entered in the number-of-spreads input unit 908 is 10, the number of scenes is less than the number of spreads, so that the processing proceeds to step S14.

Figure 8B:
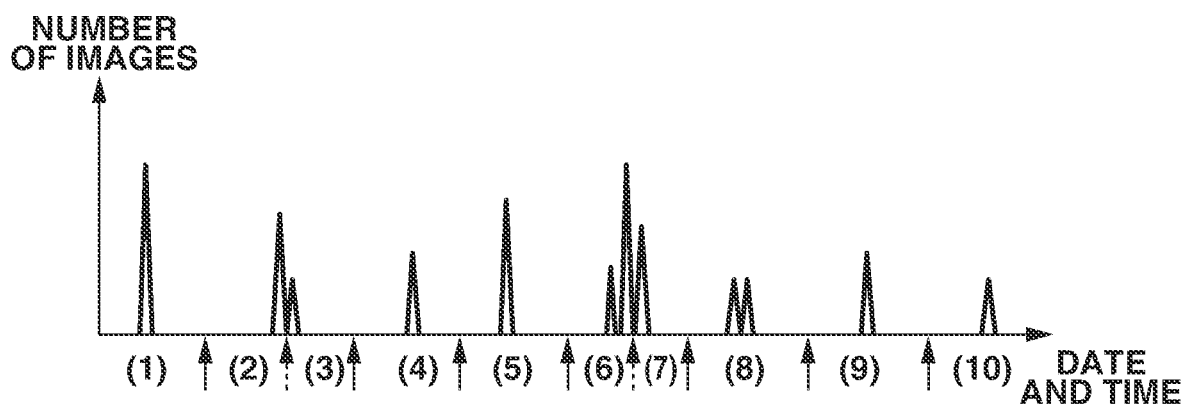

In step S14, the spread allocation unit 909 performs sub-scene segmentation. The sub-scene segmentation refers to, in the case of "the number of segmented scenes<the number of spreads", further segmenting each scene obtained by scene segmentation. Here, a case where the number of segmented scenes is 8 as illustrated in FIG. 8A while the designated number of spreads is 10 is described. FIG. 8B illustrates a result of sub-scene segmentation performed on the result of scene segmentation illustrated in FIG. 8A. Sub-image groups are further divided at portions indicated by dashed arrows, so that the number of segmented scenes is set to 10. Criteria for performing sub-scene segmentation are the number of images and image capturing data and time. The spread allocation unit 909 specifies a sub-image group having a great number of images from among the sub-image groups illustrated in FIG. 8A. Here, to increase the number of scenes by 2 from 8 to 10, the spread allocation unit 909 specifies two sub-image groups having a great number of images. Sub-image groups having a great number of images are a sub-image group (5) and, then, a sub-image group (1) and a sub-image group (2) in order from the larger number.

In the present exemplary embodiment, in a case where sub-image groups include the same number of images, the spread allocation unit 909 segments a sub-image group in which a time difference between the first image and the last image included in the sub-image group is larger. While the sub-image group (1) and the sub-image group (2) include the same number of images, since a time difference between the first image and the last image is larger in the sub-image group (2), the spread allocation unit 909 sets the sub-image group (2) as a target for segmentation. Thus, in FIG. 8B, the spread allocation unit 909 further segments each of the sub-image group (5) and the sub-image group (2).

First, a method of segmenting the sub-image group (2) is described. The sub-image group (2) has two mountains in the number of images, and the images included in the two mountains differ in the image capturing date with the respective mountains. In this case, the spread allocation unit 909 segments the sub-image group (2) at a portion at which the image capturing date changes (a portion indicated by a dashed arrow in FIG. 8B).

Next, a method of segmenting the sub-image group (5) is described. The sub-image group (5) has three mountains in the number of images, and the images included in the three mountains differ in the image capturing date with the respective mountains. In this case, the spread allocation unit 909 also segments the sub-image group (5) at a portion at which the image capturing date changes. In this instance, while the sub-image group (5) has two portions at which the image capturing date changes, the spread allocation unit 909 segments the sub-image group (5) in such a manner that a difference in number of images between the segmented sub-image groups becomes small. In FIG. 8B, the difference in number of images between the segmented sub-image groups becomes smaller in the case of segmenting the sub-image group (5) at a boundary between the second day and the third day than segmenting the sub-image group (5) at a boundary between the first day and the second day, so that the spread allocation unit 909 segments the sub-image group (5) at a boundary between the second day and the third day. Thus, the spread allocation unit 909 segments the sub-image group (5) at a portion indicated by a dashed arrow in FIG. 8B. In the above-described way, the spread allocation unit 909 changes the number of segmented sub-image groups from 8 to 10. While, here, the spread allocation unit 909 segments a sub-image group at a portion at which the image capturing date changes, in a case where a sub-image group having a great number of images are images captured on the same day, the spread allocation unit 909 segments the sub-image group at a portion at which the time difference is largest.

Figure 8C:
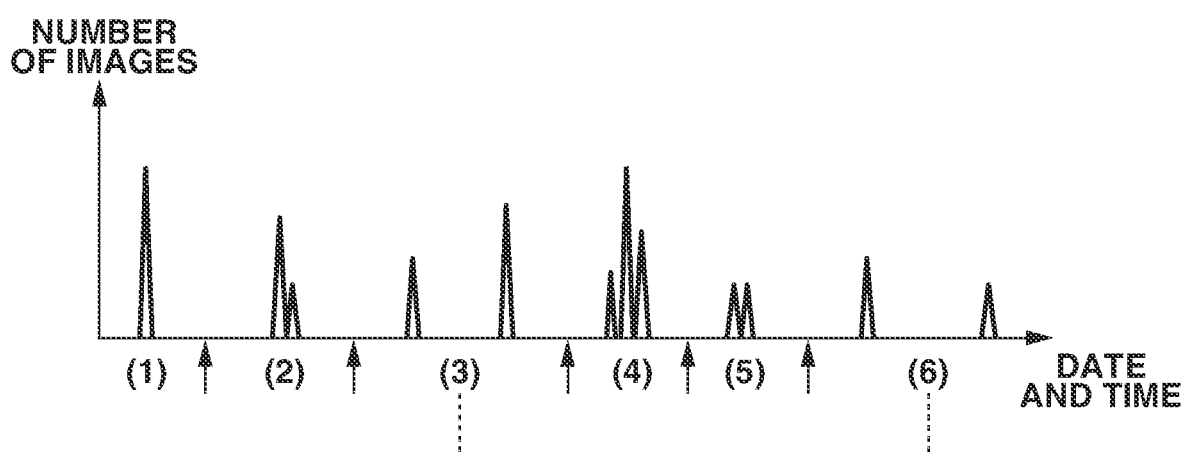

In step S15, the spread allocation unit 909 performs scene integration. The scene integration refers to, in a case where the number of scenes is greater than the number of spreads, integrating the segmented scenes (sub-image groups). Specifically, the spread allocation unit 909 performs scene integration in such a manner that the number of scenes and the number of spreads coincide with each other. FIG. 8C illustrates a result in which, in a case where the number of spreads is 6, the number of scenes illustrated in FIG. 8A is changed to 6 by scene integration. Scenes before and after a portion indicated by a dashed line are integrated, in other words, are not separated, at two places, so that the number of scenes (the number of sub-image groups) is changed to 6. In scene integration, the spread allocation unit 909 specifies a sub-image group having a small number of images. Here, to decrease the number of segmented scenes from 8 to 6, the spread allocation unit 909 specifies two sub-image groups having a small number of images.

The sub-image groups having a small number of images are a sub-image group (8), a sub-image group (3), and a sub-image group (7) in order from the smaller number. Accordingly, the spread allocation unit 909 sets, as a target for integration, the sub-image group (8). Next, the sub-image group (3) and the sub-image group (7) are equal in the number of images. Here, since the sub-image group (8) adjacent to the sub-image group (7) is a target for integration, the spread allocation unit 909 sets the sub-image group (3) as a target for integration. Next, the spread allocation unit 909 determines whether to integrate a sub-image group targeted for integration with a sub-image group in which the image capturing date and time is earlier or a sub-image group in which the image capturing date and time is later. First, integration of the sub-image group (3) is described. When the time differences between the sub-image group (3) and the respective sub-image group (2) and sub-image group (4), which are in front of and behind the sub-image group (3), are compared with each other, the difference in image capturing time between the last image of the sub-image group (3) and the first image of the sub-image group (4) is smaller than the difference in image capturing time between the first image of the sub-image group (3) and the last image of the sub-image group (2). Accordingly, the spread allocation unit 909 determines to integrate the sub-image group (3) with the sub-image group (4). Thus, the spread allocation unit 909 performs scene integration at a portion indicated by a dashed line in FIG. 8C. Next, integration of the sub-image group (8) is described. Since there is no sub-image group following the sub-image group (8), the spread allocation unit 909 integrates the sub-image group (8) with a sub-image group (7) preceding the sub-image group (8). Thus, the spread allocation unit 909 performs scene integration at a portion indicated by a dashed line in FIG. 8C. Furthermore, while, in the present exemplary embodiment, the spread allocation unit 909 integrates sub-image groups the difference in image capturing time between which is small with each other, the present exemplary embodiment is not limited to this. For example, the spread allocation unit 909 can integrate a sub-image group targeted for integration with a sub-image group having a small number of captured images.

In step S16, the spread allocation unit 909 performs spread allocation. According to steps S12 to S15, the number of sub-image groups and the designated number of spreads are made equal to each other. In the present exemplary embodiment, the spread allocation unit 909 performs allocation starting with a sub-image group with the first image capturing date and time to the first spread. Thus, the spread allocation unit 909 allocates sub-image groups to the respective double-page spreads of an album in the order of the image capturing date and time. With this, an album in which sub-image groups are arranged in the order of the image capturing date and time can be created. Furthermore, as described below, in one double-page spread, images do not need to be arranged in the order of the image capturing date and time.

In step S17, the image selection unit 910 selects a predetermined number of images from each sub-image group. Here, an example in which the image selection unit 910 selects four images from a sub-image group allocated to a certain spread is described with reference to FIGS. 11A, 11B, 11C, 11D, 11E, 11F, 11G, 11H, and 11I. Furthermore, the term "spread" as used herein refers to two pages, but each of the first spread and the last spread is one page. FIG. 11A illustrates the time difference in the image capturing date and time between the first image and the last image in a sub-image group allocated to a spread, in other words, the image capturing period of a sub-image group. The method for selecting the first image when selecting four images is described with reference to FIG. 11B. A template contains one main slot 1602 (FIG. 12). The image selection unit 910 selects, as the first image, an image for the main slot. The image selection unit 910 selects an image with the highest score for the main slot assigned in step S10 from among all of the images captured during the image capturing period of the sub-image group illustrated in FIG. 11B. Then, the image selection unit 910 selects images for the sub-slots as the second and subsequent images. In the present exemplary embodiment, the image selection unit 910 performs image selection while segmenting the image capturing period of the sub-image group, thus preventing the selected images from concentrating on a part of the image capturing period of the sub-image group. First, the image selection unit 910 divides the image capturing period of the sub-image group into two image capturing periods as illustrated in FIG. 11C. In other words, the image selection unit 910 equally divides the image capturing period of the sub-image group into two image capturing periods (into groups). Next, as illustrated in FIG. 11D, the image selection unit 910 selects an image with the highest score for the sub-slot as the second image from an image capturing period (an interval indicated by a solid line) in which the first image is not selected. Next, as illustrated in FIG. 11E, the image selection unit 910 equally divides each of the segmented image capturing periods illustrated in FIG. 11D into two periods. Then, the image selection unit 910 selects an image with the highest score for the sub-slot as the third image from images captured in solid-line intervals illustrated in FIG. 11F, i.e., two segmented image capturing periods (images corresponding to two segmented image capturing periods) in which neither of the first image and the second image is selected. Next, an example in which there is no image during an image capturing period targeted for image selection and, therefore, image selection is unable to be performed is described with regard to selection of the fourth image. In the present exemplary embodiment, the image selection unit 910 segments the image capturing period according to time irrespective of the number of images. Accordingly, there is a case where no image is present in an image capturing period obtained by segmentation. For example, as illustrated in FIG. 11G, while the fourth image is intended to be selected from an image capturing period in which an image is not yet selected (a period indicated by hatched lines), there is assumed to be no image in the hatched-line period. In that case, as illustrated in FIG. 11H, the image selection unit 910 divides each segmented image capturing period in which an image has been selected into two periods. Next, as illustrated in FIG. 11I, the image selection unit 910 selects, as the fourth image, an image with the highest score for the sub-slot from among the images captured in the solid-line image capturing periods in which the first to third images have not been selected.

In step S18, the image layout unit 912 determines an image layout of a spread targeted for processing. A case where the template input unit 911 inputs each of templates (1-1) to (4-4) illustrated in FIG. 12 to a certain spread according to the designated template information is described as an example. The number of slots of each input template is 3. Three selected images are assumed to have orientations including the portrait orientation and the landscape orientation and to be arranged in the order of image capturing date and time as indicated by arrow (A) illustrated in FIG. 12. Here, an image 1605 is assumed to be an image selected for use in a main slot, and each of an image 1606 and an image 1607 is assumed to be an image selected for use in a sub-slot. In the present exemplary embodiment, an image with the earlier image capturing date and time is assumed to be laid out in a slot closer to the upper left corner of a template, and an image with the later image capturing date and time is assumed to be laid out in a slot closer to the lower right corner of the template. Since the image 1605 is an image the image capturing date and time of which is latest and is an image for use in a main slot, templates (3-1) to (3-4) illustrated in FIG. 12 are selected as candidates therefor. Then, the earlier image 1606 for a sub-slot, which is intended to be laid out in a slot closer to the upper left corner, is a portrait-oriented image, and the later image 1607 is a landscape-oriented image. Accordingly, layout is determined in such a manner that the template (3-2) is selected as a template most appropriate for the selected images. In this way, in step S18, a template for use in layout and information available for identifying in which slot of the template to lay out which image are determined. While, in FIG. 12, a case where the number of slots is 3 is described as an example, if the required number of images is 4 in step S17, a set of templates in each of which the number of slots is 4 is prepared, and, with regard to such templates, the status of matching between the state of slots and the state of images is determined in a similar way. With this, it can be determined in which plate to lay out images.

In step S19, the image correction unit 914 performs image correction. The image correction unit 914 performs image correction in a case where the setting of turning-on of image correction is input from the image correction condition input unit 913. In the present exemplary embodiment, the image correction unit 914 automatically performs, as image correction, dodging correction, red-eye correction, and contrast correction. Moreover, in a case where the setting of turning-off of image correction is input from the image correction condition input unit 913, the image correction unit 914 does not perform image correction. The turning-on and turning-off of image correction can be performed to, for example, image data which has 1,200 pixels along the short side and which has been converted into a color space of sRGB.

In step S20, the layout information output unit 915 generates layout information. The layout information output unit 915 performs layout in a manner determined in step S18. At this time, when performing layout, the layout information output unit 915 changes the magnification of an image to be laid out in conformity with size information about each slot included in the template. Then, the layout information output unit 915 generates bitmap data in which the images are laid out in the template.

In step S21, the CPU 204 determines whether the processing in steps S17 to S20 has been completed with respect to all of the spreads. If it is determined that the processing has not yet been completed (NO in step S21), the processing returns to step S17. If it is determined that the processing has been completed (YES in step S21), the automatic layout processing ends.

<Editing of Photo Album>

Next, an operation to be performed to edit a photo album subjected to layout is described. Here, an example of interchanging a photograph set in a slot of a certain page and a photograph set in a slot of another page is described. In the present exemplary embodiment, a photograph (image) subjected to layout is deemed to be a display item, and an example of display control to move the item based on a user operation is described.

FIGS. 13A, 13B, 13C, 13D, 13E, 13F, 13G, 13H, and 13I illustrate a condition in which an editing screen 401 for a photo album is displayed in full-screen mode within a display region of a terminal apparatus 1301 (a smartphone or a tablet terminal), which is the information processing apparatus 1. The terminal apparatus 1301 includes a home button 1302.

Figure 13A:
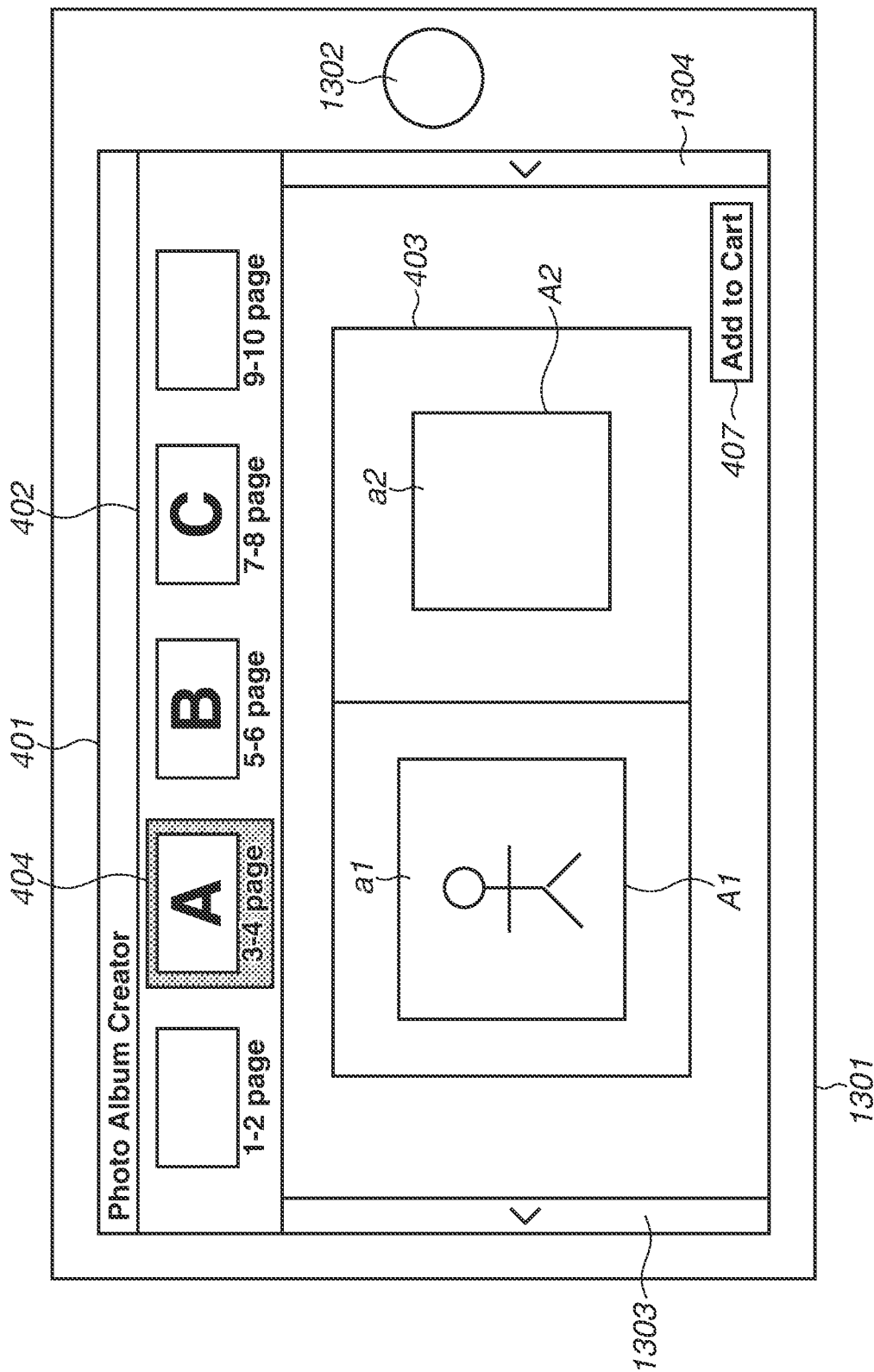
Figure 13B:
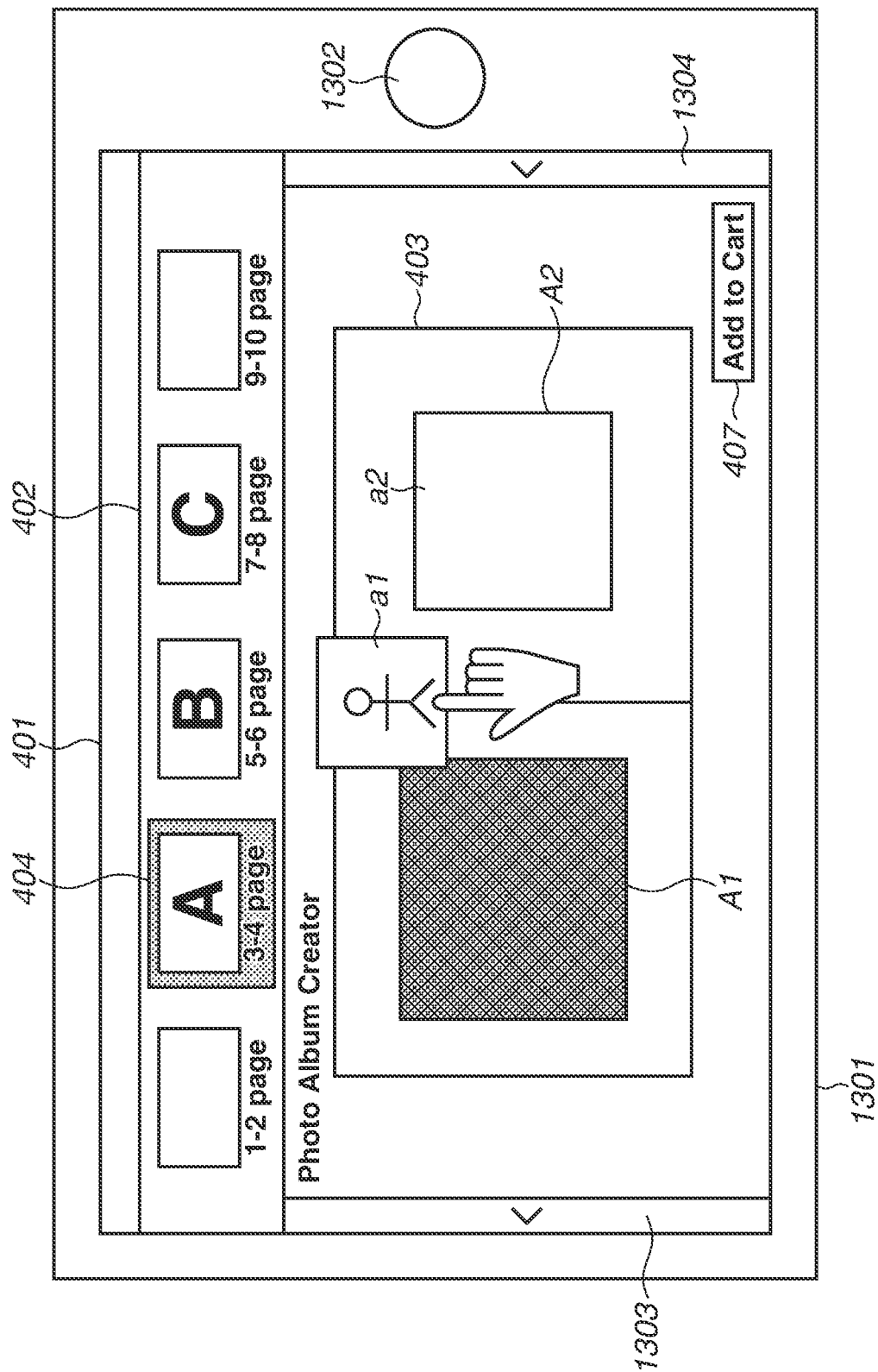

In FIG. 13A, a spread A is selected in the display region 402 for thumbnails and, therefore, the spread A is previewed in the display region 403 for a photo album. Furthermore, the spread A is assumed to correspond to page 3 and page 4 of the album. Slots A1 and A2, which serve as placement regions for photographs, are set in a template for the spread A, and photographs a1 and a2 are placed in the slots A1 and A2, respectively. FIG. 13B is a diagram illustrating a condition in which the user performs a drag operation on the photograph a1 in the slot A1 and holds the photograph a1. Since the state of dragging and holding the photograph a1 is the state of extracting a photograph from the photograph a1, the inside of the slot A1 is displayed in gray and, therefore, indicates that no photograph is set therein. FIG. 13C illustrates the state in which the user has moved the photograph a1 held by the drag operation to a next-page switching region 1304 and has superposed the photograph a1 on the next-page switching region 1304. In this way, superposing a photograph on the next-page switching region 1304, which is located at the page end portion of the display region, by the drag operation causes displaying of the display region 403 for a photo album to be switched to a spread B.

The next-page switching region 1304 is a region used to display a next page. Not only superposing an image on the next-page switching region 1304 by a drag operation for the image but also selecting the next-page switching region 1304 by an operation, such as tap or click, performed by the user causes displaying the display region 403 to be switched to a next page. On the other hand, a previous-page switching region 1303 is a region used to display a previous page. Moving a photograph held by a drag operation and superposing the photograph on the previous-page switching region 1303 causes displaying of the display region 403 for a photo album to be switched to a previous page. Moreover, selecting the previous-page switching region 1303 by, for example, tap or click also causes displaying of the display region 403 for a photo album to be switched to a previous page. Furthermore, while, in FIGS. 13A to 13I, displaying of the display region 403 is switched in units of spread, displaying in the present exemplary embodiment can be switched in units of page.

As illustrated in FIG. 13C, the spread B includes slots B1, B2, and B3, in which photographs b1, b2, and b3 are placed, respectively. FIG. 13D is a diagram illustrating the state in which the user has performed a wrong operation to bring the finger for dragging to outside the touch panel, which is the display region. This causes the touch operation to be released and the drag operation to be canceled, so that cancel processing is started. Typically, the cancel processing in the present exemplary embodiment is processing for, in response to the release of the drag operation, returning an item subjected to the drag operation to a previous placement region obtained before the start of the drag operation.

FIGS. 13E and 13F are diagrams illustrating a halfway state in which, as the user has inadvertently canceled the drag operation, the photograph a1 is in the process of returning to the previous slot A1, which is the previous placement region. In the present exemplary embodiment, in a case where drag is canceled, the photograph a1 does not immediately return to the previous slot A1 to complete cancel processing, but control is performed to complete cancel processing over a certain predetermined period. In this example, as illustrated in FIGS. 13E and 13F, in a case where drag of the photograph a1 is canceled due to the touch operation being released, the photograph a1 temporarily remains within a predetermined range (typically, the position where drag is canceled) for a predetermined time, and moves from the predetermined range to the placement region after elapse of the predetermined time. Furthermore, in FIGS. 13E and 13F, while remaining within the predetermined range, the photograph a1 undergoes a predetermined change. More specifically, the photograph a1 performs a swinging motion to repeat a movement of rotating by a given angle in the counterclockwise direction (FIG. 13E) and a movement of rotating by a given angle in the clockwise direction (FIG. 13F) a given number of times. After that, the photograph a1 returns to the previous slot A1, in which the photograph a1 has been placed before starting of the drag operation.

Figure 13I:
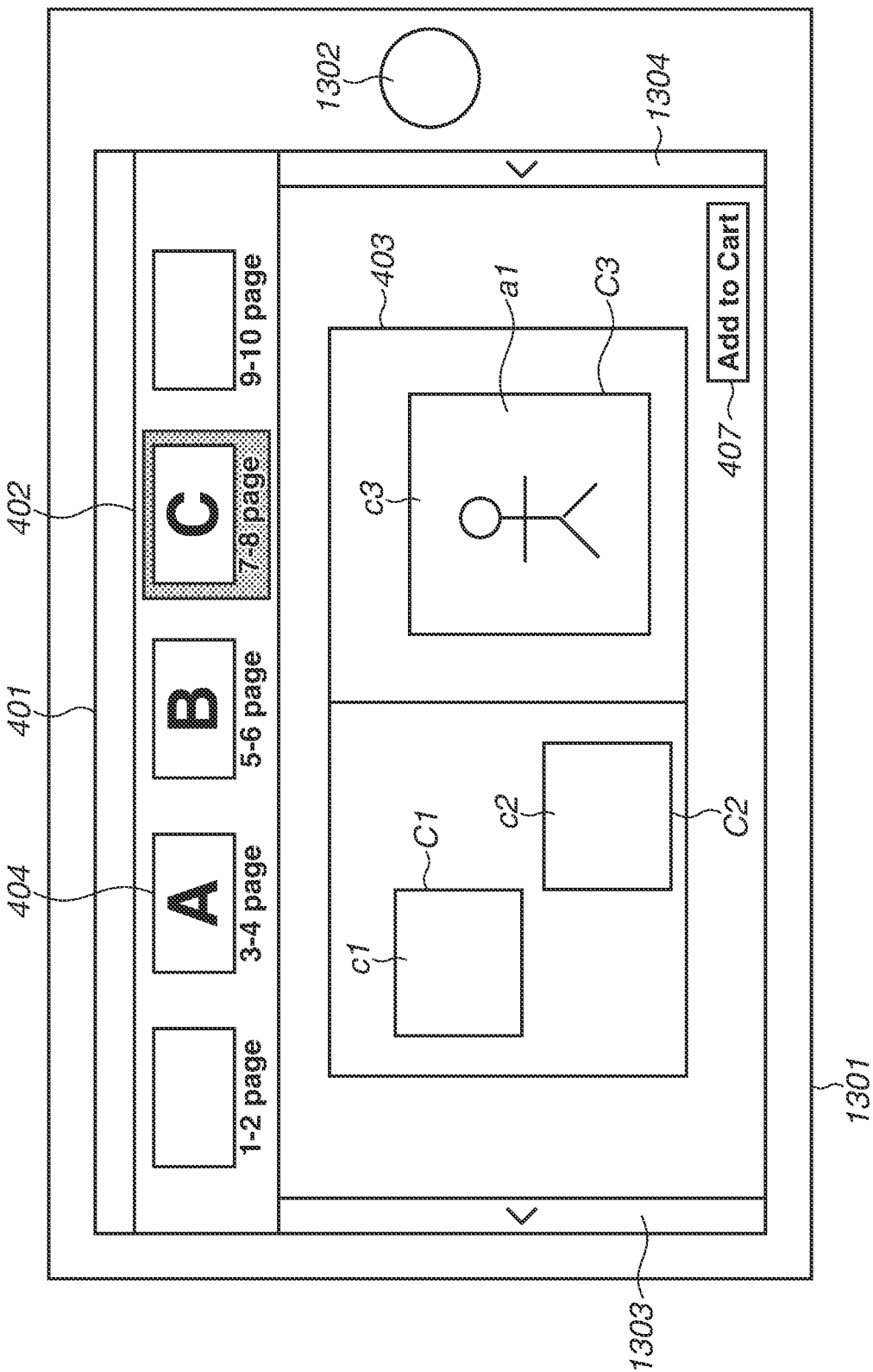

When the user touches the panel before the cancel processing is completed, the cancel processing is canceled, so that the user can resume the drag operation (FIG. 13G). After the drag operation is resumed, the user performs the drag operation on the photograph a1 to switch displaying of the display region 403 to page 7 and page 8 of a spread C and superpose the photograph a1 on a slot C3, in which interchange of photographs is intended (FIG. 13H). When the user cancels drag with the photograph a1 superposed on the slot C3 and drops the photograph a1, the photograph a1 is placed in the slot C3 (FIG. 13I). Furthermore, in FIG. 13H, when the photograph a1 is superposed on the slot C3, the slot frame of the slot C3 becomes thick. This indicates that interchange of photographs has become ready, and, when the user cancels drag of the photograph a1 with the slot frame of the slot C3 thick, the photograph a1 is set to the slot C3.

In this way, in the present exemplary embodiment, when, before cancel processing is completed, an input to the display region, such as touch or click, by the user is received, the cancel processing is stopped. Therefore, the user can resume the drag operation before the photograph a1 returns to the previous slot.

Furthermore, in the example illustrated in FIGS. 13A to 13I, during cancel processing, before an item moves to a previous placement region, an operation of remaining within a predetermined range for a given period (a waiting operation) is performed. This waiting operation desirably makes it easy for the user to catch an item by, for example, touch again after drag is canceled and to perform a drag operation thereon. Furthermore, while, in the example illustrated in FIG. 13G, the user touches the photograph a1, serving an item, to stop cancel processing and then resumes drag of the photograph a1, the present exemplary embodiment is not limited to this. Even when an input (an input that is based on, for example, touch (including tap and long-press) or click) to an area other than the item in the display region is received, cancel processing can be configured to be stopped. In this case, the item can be desirably configured to be moved as if attracted to the position corresponding to the user input, so that the subsequent drag operation to be performed can be facilitated.

Here, a change in the photograph a1 occurring during the waiting operation illustrated in FIGS. 13E and 13F is described in detail with reference to FIG. 14. FIG. 14 is a diagram illustrating an animation occurring in the process of cancel processing in a case where a drag operation of the item 1401 is canceled. For example, in a case where drag of the item 1401 is canceled in a state (1) illustrated in FIG. 14, first, the item 1401 is rotated clockwise by a given angle (to a state (2) illustrated in FIG. 14). Next, the item 1401 is rotated counterclockwise by a given angle (to a state (3) illustrated in FIG. 14), and then returns to the initial state (to a state (4) illustrated in FIG. 14). The item 1401 repeats such a swinging motion for a predetermined time.

In this way, during a waiting operation in the process of cancel processing, an item desirably performs a predetermined animation, so that it becomes easily understandable that the item is in a waiting state and, therefore, visibility is improved. Furthermore, while, in the example illustrated in FIG. 14, an animation in which the item is rotated is described as an example, the present exemplary embodiment is not limited to this. For example, when drag of an item is canceled, such control as to gradually make displaying of the item transparent and enable resumption of drag until displaying of the item becomes fully transparent, or such control as to blink the item, can be employed, so that the type of animation is not limited. Furthermore, an animation does not necessarily need to be performed in the process of cancel processing.

Figure 15A:
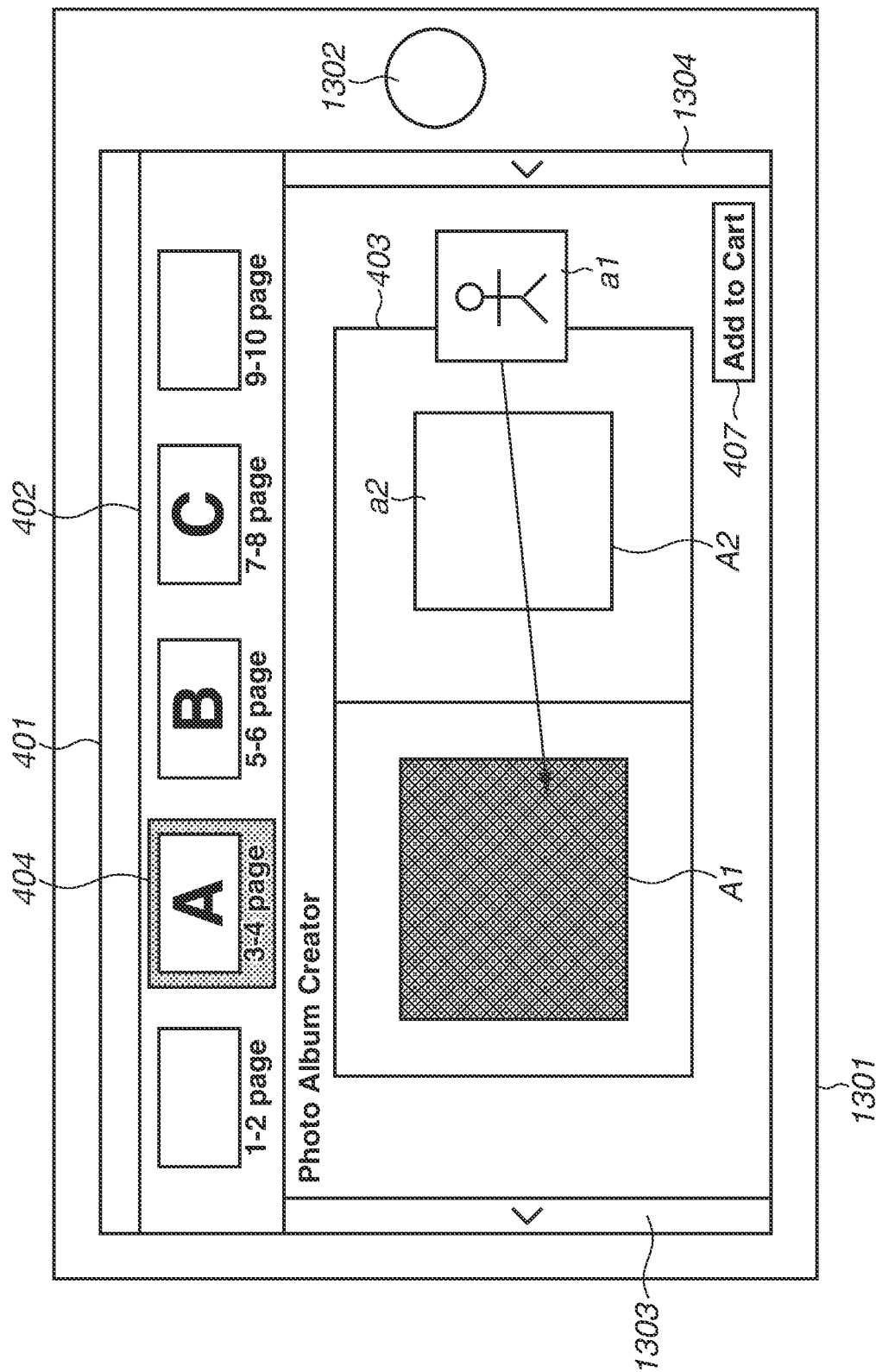
FIGS. 15A and 15B are schematic diagrams illustrating cancel processing.
Figure 15B:
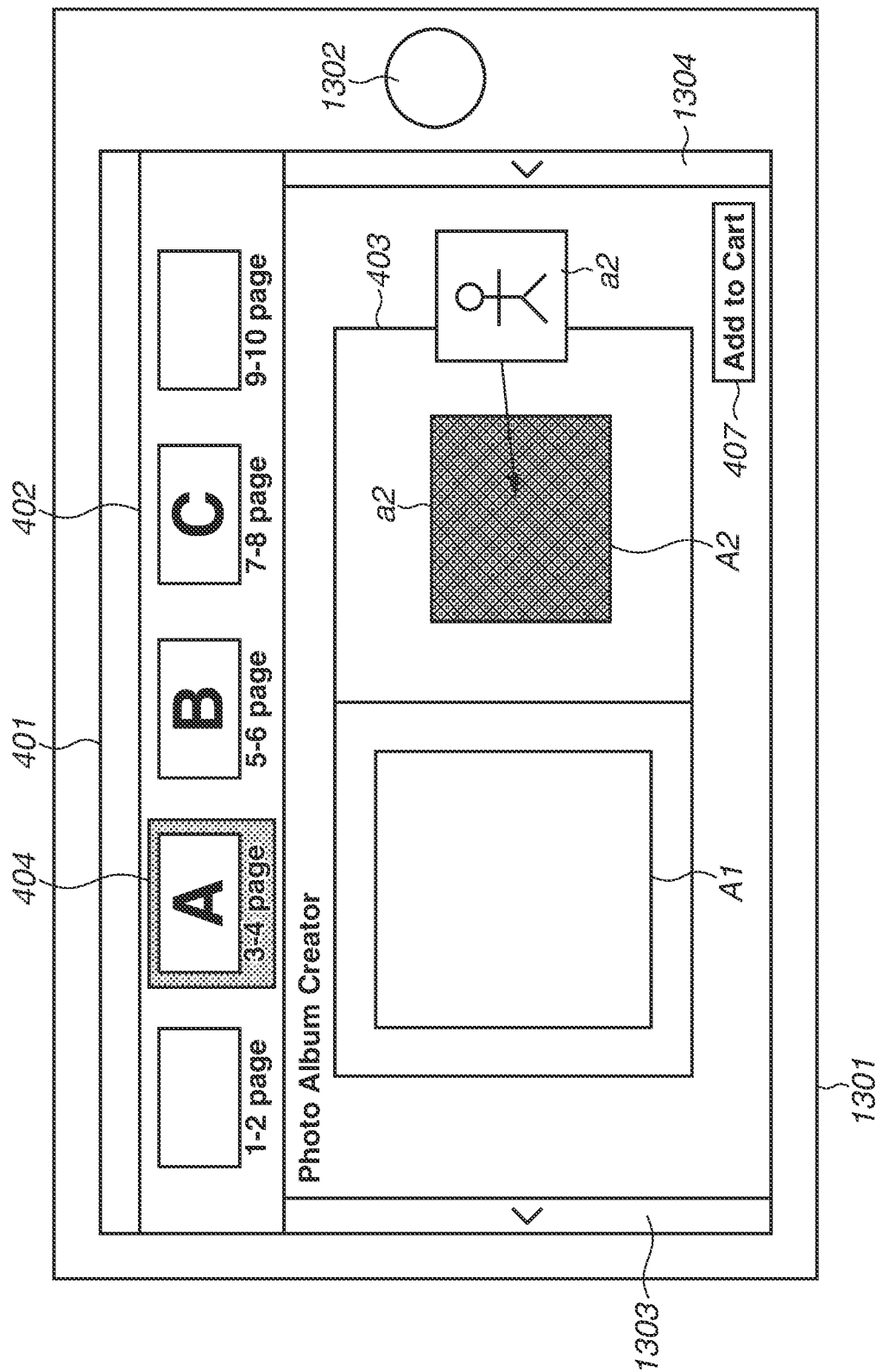

FIGS. 15A and 15B are diagrams illustrating an operation of returning to the previous slot due to cancel processing. Specifically, FIGS. 15A and 15B illustrates a condition in which, after an animation in which the item illustrated in FIGS. 13A to 13I and FIG. 14 rotates is performed, the photograph a1 returns to the previous slot A1. Even during this movement operation, when an input, such as touch or click, to the screen by the user is received, cancel processing is stopped and, therefore, the user can resume the drag operation.

FIG. 15A illustrates a condition in which, in a case where the previous placement region is a slot A1, a photograph a1 is about to return to the slot A1, and FIG. 15B illustrates a condition in which, in a case where the previous placement region is a slot A2, a photograph a2 is about to return to the slot A2. If a comparison is made in the distance by which the photograph returns to the previous slot between the cases illustrated in FIGS. 15A and 15B, the distance in the case illustrated in FIG. 15B is shorter. Therefore, if the photograph is returned to the slot at the same movement speed, the movement time in the case illustrated in FIG. 15B is shorter. In other words, in the case of illustrated in FIG. 15B, since the distance to the previous slot is short, the photograph moves in a short amount of time to complete cancel processing, so that it is difficult for the user to perform inputting to the screen during the movement operation to stop cancel processing and to resume the drag state. Therefore, such control as to make the speed for returning to the slot not constant and to make the movement speed lower in a case where the distance to the slot is short than in a case where the distance to the slot is long can be employed. Typically, the movement speed for returning to the slot is made variable, so that the movement time is made constant irrespective of the movement distance. Such control can be desirably employed to make it easy for the user to resume drag even in a case where the distance to the previous placement region is short.

<Display Control Flow for Item>

Figure 16:
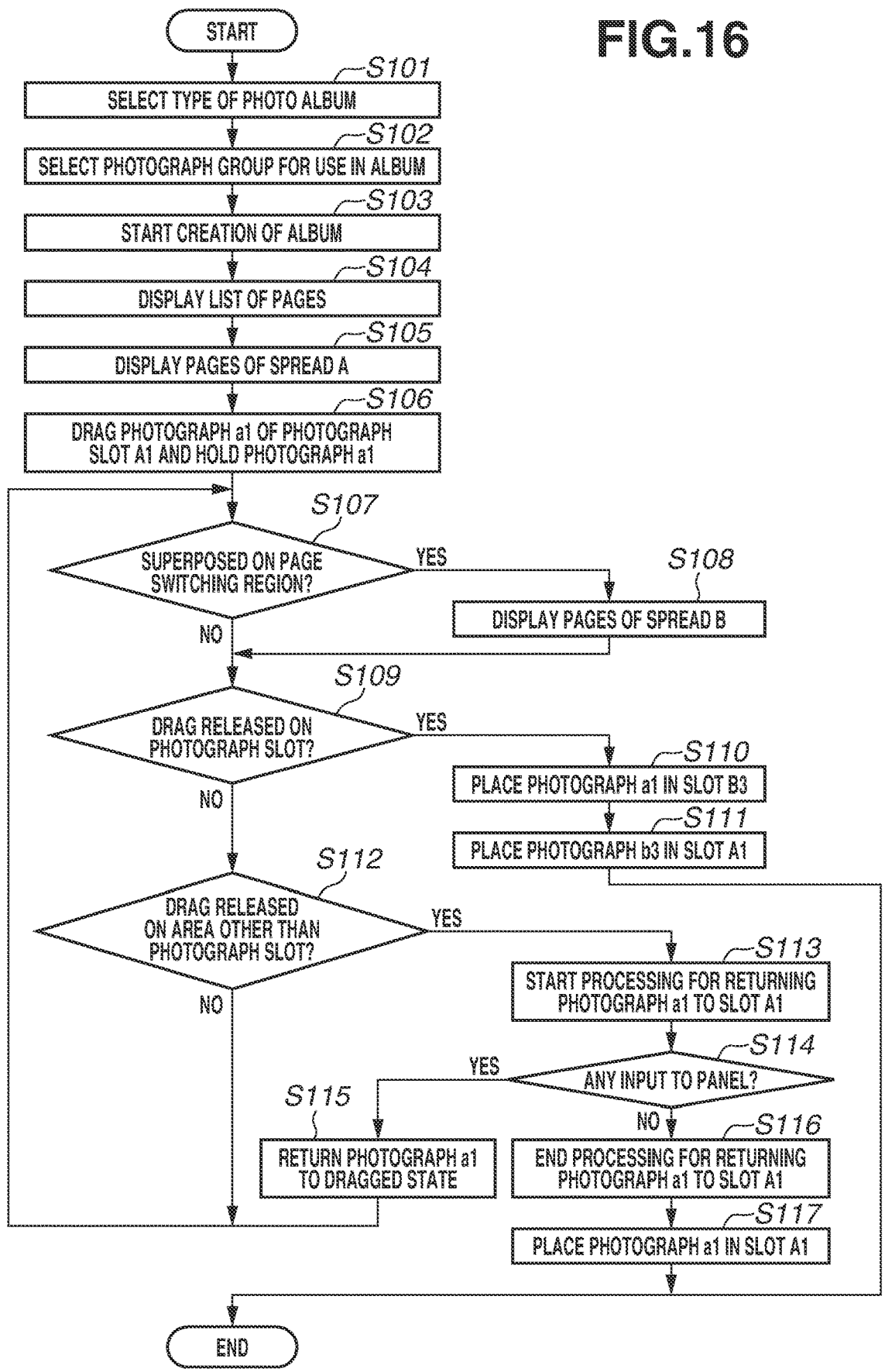
FIG. 16 is a flowchart illustrating a display control method.

FIG. 16 is a flowchart illustrating a display control flow concerning displaying of an item described with reference to FIGS. 13A to 13I. The flowchart illustrated in FIG. 16 is implemented by, for example, the CPU 204 loading a program stored in the HDD 202 onto the ROM 203 or the RAM 201 and executing the program.

In step S101, the CPU 204 selects and sets the type of a photo album based on an instruction from the user. Types of photo albums include, for example, the size, the number of pages, the method of binding, and the type of paper of each photo album.

In step S102, the CPU 204 selects and sets a photograph group to be used for automatic layout of the photo album based on an instruction from the user. For example, in a case where photographs are saved in a picture folder, when the user selects an intended folder from within the picture folder, the CPU 204 selects a photograph group contained in the folder as a layout target.

In step S103, the CPU 204 starts creation of the photo album. For example, the CPU 204 automatically selects a template, which is used to place photographs therein, according to the type of a photo album selected in step S101 and the photograph group selected in step S102, and automatically places photographs in slots included in the template. This step represents the flow of a series of operations of automatic layout processing illustrated in FIG. 6. Furthermore, while, here, a mode in which image layout is automatically performed has been described, the present exemplary embodiment is not limited to that mode, but the user can manually select a template or a photograph to create a photo album.

In step S104, the CPU 204 displays a list of thumbnails of pages subjected to layout in the display region 402.

In step S105, in response to thumbnails corresponding to intended pages (assumed to be a spread A) in the display region 402 being selected by the user, the CPU 204 displays page 2 and page 3 of the spread A in the display region 403. The user can use this screen to manually correct a layout image obtained as a result of automatic layout.

In step S106, according to an input by the user, the CPU 204 holds the photograph a1 of the slot A1 of the spread A by drag and moves the photograph a1.

In step S107, the CPU 204 determines whether the photograph a1 held by drag has been superposed on the previous-page switching region 1303 or the next-page switching region 1304. If it is determined that the photograph a1 has been superposed on the previous-page switching region 1303 or the next-page switching region 1304 (YES in step S107), the processing proceeds to step S108, and, if it is determined that the photograph a1 has not been superposed thereon (NO in step S107), the processing proceeds to step S109. Furthermore, while, as a criterion for determination in step S107, the detection of a predetermined amount (predetermined area) of the photograph a1 being superposed on the switching region leads to the determination of YES in the case illustrated in FIGS. 13A to 13I, the present exemplary embodiment is not limited to this. For example, when a predetermined point on the photograph a1 contacts the switching region, the state of superposition can be determined, or when a pointer used to drag the photograph a1 enters the switching region, the state of superposition can be determined. Furthermore, while the state of superposition continuing for a predetermined time or more leads to the determination of YES, a determination criterion by which the state of superposition continuing for less than the predetermined time leads to the determination of NO can be provided.

In step S108, in response to the photograph a1 being superposed on the next-page switching region 1304, the CPU 204 switches displaying of the display region 403 from the spread A to the spread B (page 5 and page 6).

In step S109, the CPU 204 determines whether the dragged photograph has been released (dropped) on any slot. If it is determined that the dragged photograph has been released on any slot (YES in step S109), the processing proceeds to step S110, and, if it is determined that the dragged photograph has not been released on any slot (NO in step S109), the processing proceeds to step S112. Furthermore, while, as a criterion for determination in step S109, the detection of release with a predetermined amount (predetermined area) of the photograph being superposed on any slot leads to the determination of YES in the case illustrated in FIGS. 13A to 13I, the present exemplary embodiment is not limited to this. For example, the state of a predetermined point on the photograph being present within a predetermined range in the slot can be determined as the state of the photograph being superposed on the slot, and the release of drag in this state can lead to the determination of YES. Moreover, when a pointer used to drag the photograph a1 enters the slot, the state of superposition can be determined, and the release of drag in this state can lead to the determination of YES. Furthermore, while the state of superposition continuing for a predetermined time or more leads to the determination of YES, a determination criterion by which the state of superposition continuing for less than the predetermined time leads to the determination of NO can be provided.

In step S110, the CPU 204 places a photograph in the slot subjected to release. For example, in a case where the dragged photograph a1 has been released on the slot B3 of the spread B, the CPU 204 places the photograph a1 in the slot B3.

In step S111, the CPU 204 places the photograph b3, which has previously been placed in the slot B3, in the slot A1, in which the photograph a1 has previously been placed. Thus, the photograph a1 and the photograph b3 are interchanged with respect to placement regions.

In step S112, the CPU 204 determines whether the dragged and moved photograph has been released on an area other than the slot. If it is determined that the photograph has been released on an area other than the slot (YES in step S112), the processing proceeds to step S113, and, if it is determined that the photograph has not been released on an area other than the slot (NO in step S112), the processing returns to step S107. Furthermore, while, as a criterion for determination in step S112, the detection of release with the photograph not contacting the slot at all is determined as the release on an area other than the slot (YES), the present exemplary embodiment is not limited to this. For example, in a case where, even if a part of the photograph contacts the slot, a predetermined point on the photograph is not present within a predetermined range in the slot, the photograph released in that state can be determines as being released on an area other than the slot (YES).

In step S113, the CPU 204 starts cancel processing for returning the photograph to the previous slot. For example, in a case where drag of the photograph a1 is canceled on an area other than the slot, the CPU 204 starts cancel processing for returning the photograph a1 to the slot A1.

In step S114, the CPU 204 determines whether inputting to the display region has been performed by the user before the photograph returns to the slot. For example, the CPU 204 determines whether click or touch has been performed before the photograph a1 returns to the slot A1. If it is determined that inputting has been performed (YES in step S114), the processing proceeds to step S115, and, if it is determined that inputting has not been performed (NO in step S114), the processing proceeds to step S116.

In step S115, the CPU 204 stops the cancel processing and brings about a state in which the user can re-perform a drag operation on the photograph. For example, the CPU 204 stops the cancel processing and, without returning the photograph a1 to the slot A1, resumes a dragged state of the photograph a1 at the position at which the cancel processing is stopped.

In step S116, the CPU 204 completes the cancel processing. Thus, processing for returning the photograph a1 to the slot A1 ends. With this, in step S117, the CPU 204 completes the placement of the photograph a1 in the slot A1.

As described above, in the present exemplary embodiment, in a case where inputting, such as touch or click, to the display region by the user has been received before cancel processing is completed, the cancel processing is stopped. Therefore, the user can resume a drag operation before the photograph returns to the previous slot.

Furthermore, while, in the above-described example, the CPU 204 performs, as cancel processing, both waiting processing in which the item remains within a predetermined range for a predetermined time and movement processing in which the item moves from the predetermined range to the previous placement region, the present exemplary embodiment is not limited to this. The cancel processing can be only the waiting processing or can be only the movement processing.

Moreover, in the movement processing included in the cancel processing, in a case where, for example, an item is moved by a drag operation from page 1 to page 6 and drag is canceled at the end portion of page 6, the item can be moved in such a way as to return from page 6 in order in increments of one page. Additionally, besides the above control, for example, such control as to move the item to jump from page 6 to page 2 (switch pages) and to move the item from the halfway portion of page 2 to the previous placement region can be employed.

Furthermore, while, in the above-described example, the CPU 204 returns the photograph to the previous slot as cancel processing, the present exemplary embodiment is not limited to this. For example, the item can be placed in a slot closest to the position at which drag is released. Thus, in a case where the item is released at an area other than the placement region, the item can be moved in such a way as to be placed in any placement region. If drag of the item is released at the page end portion, since the page end portion is provided with no placement region, in other words, is other than the placement region, the item is shifted from the page end portion to the page central portion by cancel processing.

Moreover, while, in the above-described example, the description is premised on the cancel processing at the time of movement between pages, in the present exemplary embodiment, even if only one page is included, similar cancel processing can be applied when drag is released at an area other than the replacement region. The control flow usable in this case is similar to a flow obtained by omitting steps S107 and S108 from the control flow illustrated in FIG. 16.

In a second exemplary embodiment, an example in which an application icon that is displayed on a display unit of a terminal apparatus, such as a smartphone or a tablet, is used as an item is described. The configuration of an information processing apparatus 1 is similar to that in the first exemplary embodiment and is, therefore, omitted from description. Moreover, with regard to the flow of display control, portions different from those in the first exemplary embodiment are mainly described.

Figure 17A:
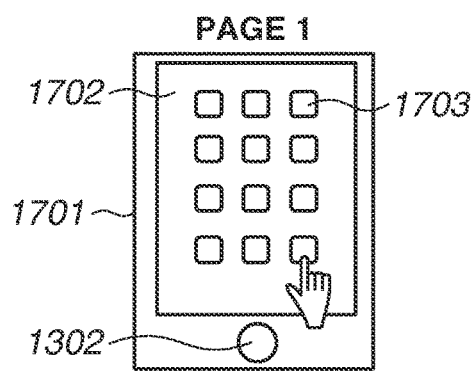
FIGS. 17A, 17B, 17C, 17D, 17E, 17F, 17G, 17H, 17I, 17J, 17K, and 17L are schematic diagrams illustrating a display control method.

FIGS. 17A, 17B, 17C, 17D, 17E, 17F, 17G, 17H, 17I, 17J, 17K, and 17L are schematic diagrams illustrating displaying of application icons 1703, which are displayed on a touch panel 1702 of a terminal apparatus 1701. In this example, the application icons 1703 are respectively arranged on page 1 to page 3. In the present exemplary embodiment, the user is assumed to place an application icon present on page 1 to page 3. FIG. 17A is a diagram illustrating a state in which page 1 is displayed, in which twelve application icons 1703 are arranged. First, in FIG. 17A, when the user selects a lower right application icon 1703, the CPU 204 brings the item into a dragged state.

Figure 17B:
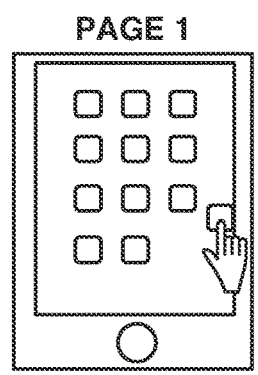
Figure 17C:
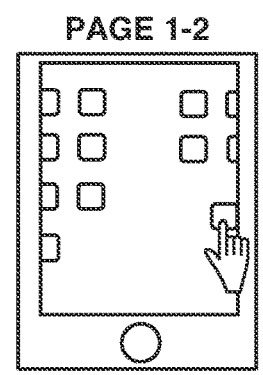
Figure 17D:
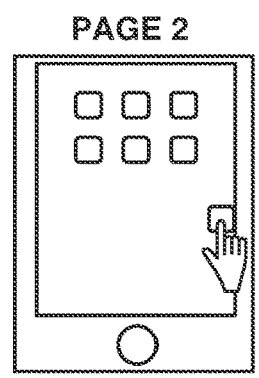

FIG. 17B illustrates a state in which the CPU 204 has moved the application icon 1703 to the right end of the panel while dragging the application icon 1703. If the dragged state is kept for a given time at this position, pages are switched from page 1 to page 2 as illustrated in FIG. 17C, and, finally, page 2 is displayed as illustrated in FIG. 17D. Six application icons 1703 are arranged on page 2. Furthermore, after page 2 is displayed, in a case where an icon is dropped on a placement region set in page 2, the icon is placed in the placement region. A placement region in the second exemplary embodiment is a region which is previously set in the display region and in which an item can be placed. Furthermore, in a case where a different icon is already placed in a placement region located at the position subjected to dropping, the CPU 204 can move the different icon to a different placement region. Moreover, the CPU 204 can generate a new folder which is configured to contain the different icon and the dropped icon. Furthermore, as a criterion for determining whether the icon is present on the placement region, as with the first exemplary embodiment, not the whole area of the item needs to be present on the placement region, so that a case where a predetermined area (for example, half of the area) of the item is present on the placement region or a case where a predetermined point on the item is present within a predetermined range in the placement region can be employed.

Figure 17E:
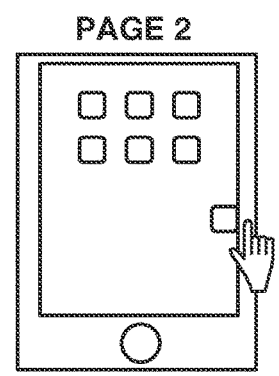
Figure 17F:
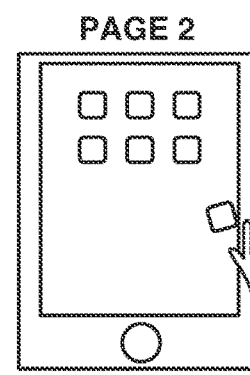
Figure 17G:
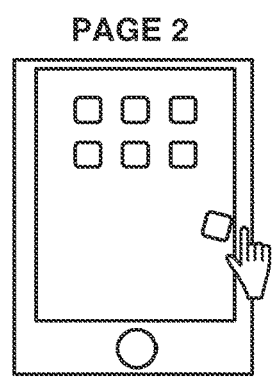
Figure 17H:
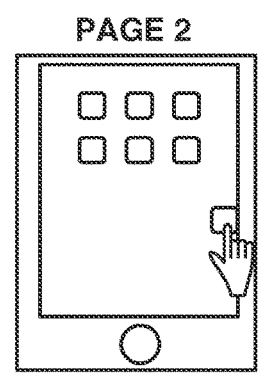
Figure 17I:
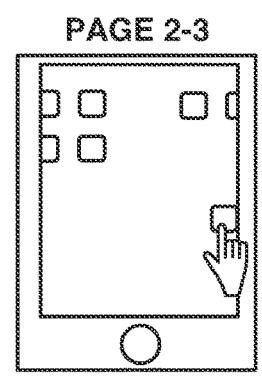

FIG. 17E is a diagram illustrating a condition in which the hand of the user has inadvertently moved away from the panel 1702 at the end portion of the display region. In this case, the CPU 204 determines that drag of the item has been canceled at the end portion (an area in which no placement region is set) of the display region, and starts cancel processing. In the present exemplary embodiment, as illustrated in FIGS. 17F and 17G, the CPU 204 first performs waiting processing as the cancel processing, as in the first exemplary embodiment. More specifically, the CPU 204 performs an animation in such a way as to rotate the application icon 1703 clockwise (FIG. 17F) and counterclockwise (FIG. 17G) by a given angle within a predetermined range for a predetermined time. While performing such an animation, the CPU 204 is able to stop cancel processing in response to receiving an input to the panel 1702 from the user, and is thus able to bring about a state in which the user can re-perform a drag operation (FIG. 17H).

Furthermore, in a case where, in the process of the cancel processing, no input to the display region of the panel 1702 is performed by the user, the CPU 204 replaces the application icon 1703 in page 2, in which the application icon 1703 is displayed.

Figure 17J:
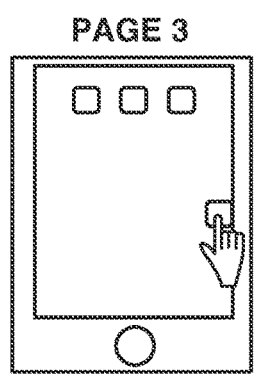
Figure 17K:
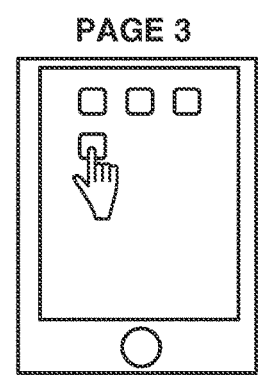

When the CPU 204 resumes the dragged state and holds the application icon 1703 at the eight end of the panel 1702 for a given time, the displayed page is switched from page 2 to page 3 (FIG. 17I), and page 3 is then displayed (FIG. 17J). Three application icons 1703 are displayed on page 3. Page 3 is a page to which the user intends to move the application icon 1703. The CPU 204 moves the application icon 1703 to an intended position while keeping the dragged state, based on the user operation (FIG. 17K).

Figure 17L:
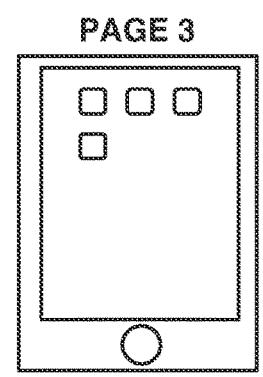

Finally, in response to the user operation, the CPU 204 cancels drag on the placement region to place the application icon 1703 to the position intended by the user (FIG. 17L).

As described above, even in the second exemplary embodiment, in a case where inputting, such as touch or click, to the display region by the user has been received before cancel processing is completed, the cancel processing is stopped. Therefore, the user can resume a drag operation before the item is placed in any placement region.

Furthermore, while, in the above-described example, the CPU 204 performs, as cancel processing, both waiting processing in which the item remains within a predetermined range for a predetermined time and movement processing in which the item moves from the predetermined range to the previous placement region, the present exemplary embodiment is not limited to this. The cancel processing can be only the waiting processing or can be only the movement processing.

Moreover, the movement processing included in the cancel processing is not limited to an example in which, in a case where, for example, an item is moved by a drag operation from page 1 to page 6 and drag is canceled at the end portion of page 6, the item is moved in such a way as to return from page 6 in order in increments of one page. For example, such control as to move the item to jump from page 6 to page 2 (switch pages) and to move the item from the halfway portion of page 2 to the previous placement region can be employed.

Furthermore, in the cancel processing, the CPU 204 can return the item to the previous placement region, or can place the item at a placement region closest to the position at which dropping is performed or at a placement region having a high preference of placement. Thus, in a case where the item is released at an area other than the placement region, the item can be moved in such a way as to be placed in any placement region. If drag of the item is released at the page end portion, since the page end portion is provided with no placement region, in other words, is other than the placement region, the item is shifted from the page end portion to the page central portion by cancel processing.

Moreover, while, in the above-described example, the description is premised on the cancel processing at the time of movement between pages, in the present exemplary embodiment, even if only one page is included, similar cancel processing can be applied when drag is released at an area other than the replacement region.

While, in the above-described exemplary embodiments, an example in which a photograph subjected to layout or an application icon is used as an item has been described, other items can also be used. For example, display items, such as an image other than photographs, a text box, an operation button, a shortcut, and content, can also be used.

Furthermore, while, in the above-described exemplary embodiments, an example in which a terminal apparatus, such as a smartphone or a tablet, is used as the information processing apparatus 1 has been described, other apparatuses can also be used. For example, an image processing apparatus, such as a PC or a printer, can also be used.

According to exemplary embodiments of the present disclosure, a drag operation can be resumed before an item is relocated, so that user convenience can be improved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-016210 filed Jan. 31, 2017, which is hereby incorporated by reference herein in its entirety.

What is claimed is:

1. An information processing apparatus comprising:
at least one processor configured to cause the information processing apparatus to act as:
a first control unit configured to move an item placed at a predetermined placement region of a plurality of placement regions set in a display region of a display unit, based on a drag operation of a user;
a second control unit configured to perform, in response to the drag operation being released in an area other than the plurality of placement regions, cancel processing for placing the item in any placement region of the plurality of placement regions; and
a third control unit configured to stop, in response to a user operation being performed on the display region while the cancel processing is performed, the cancel processing,
wherein the second control unit performs, as the cancel processing, processing for causing the item to remain within a predetermined range for a predetermined time and processing for moving the item from the predetermined range to the any placement region after the predetermined time elapses.

2. The information processing apparatus according to claim 1, wherein, after stopping the cancel processing, the third control unit brings the item into a state enabling a drag operation of the user to be performed thereon.

3. The information processing apparatus according to claim 1, wherein, while causing the item to remain within the predetermined range, the second control unit causes the item to undergo a predetermined change.

4. The information processing apparatus according to claim 1,
wherein, even in a case where inputting to an area other than the item of the display region by the user is received before the cancel processing is completed, the third control unit stops the cancel processing, and
wherein the third control unit places the item at a position corresponding to the inputting.

5. The information processing apparatus according to claim 1, wherein the at least one processor is further configured to cause the information processing apparatus to act as a layout unit configured to lay out an image into a slot included in a template,
wherein, after layout is performed, the first control unit moves an image located in the slot as the item based on a drag operation of the user.

6. The information processing apparatus according to claim 1, wherein the first control unit moves an application icon as the item based on a drag operation of the user.

7. The information processing apparatus according to claim 1, wherein, in the cancel processing, the second control unit returns the item to a placement region in which the item has been placed before being subjected to the drag operation.

8. The information processing apparatus according to claim 1, wherein, in the cancel processing, the second control unit sets a movement speed of the item used in a case where a distance by which the item moves is a first distance lower than a movement speed of the item used in a case where the distance is a second distance longer than the first distance.

9. An information processing apparatus comprising:
at least one processor configured to cause the information processing apparatus to act as:
a first control unit configured to move an item placed on a predetermined page in a display region of a display unit to a page different from the predetermined page based on a drag operation of a user;
a second control unit configured to perform, in response to the drag operation being released at an end portion of the predetermined page, cancel processing for shifting the item to an area closer to a central portion than the end portion of the predetermined page; and
a third control unit configured to stop, in response to a user operation being performed on the display region while the cancel processing is performed, the cancel processing,
wherein the second control unit performs, as the cancel processing, processing for causing the item to remain within a predetermined range for a predetermined time and processing for moving the item from the predetermined range to the area closer to the central portion after the predetermined time elapses.

10. The information processing apparatus according to claim 9, wherein, after stopping the cancel processing, the third control unit brings the item into a state enabling a drag operation of the user to be performed thereon.

11. The information processing apparatus according to claim 9, wherein, while causing the item to remain within the predetermined range, the second control unit causes the item to undergo a predetermined change.

12. The information processing apparatus according to claim 9,
wherein, even in a case where inputting to an area other than the item of the display region by the user is received before the cancel processing is completed, the third control unit stops the cancel processing, and
wherein the third control unit places the item at a position corresponding to the inputting.

13. The information processing apparatus according to claim 9, wherein the at least one processor is further configured to cause the information processing apparatus to act as a layout unit configured to lay out an image into a slot included in a template,
wherein, after layout is performed, the first control unit moves an image located in the slot as the item based on a drag operation of the user.

14. The information processing apparatus according to claim 9, wherein the first control unit moves an application icon as the item based on a drag operation of the user.

15. The information processing apparatus according to claim 9, wherein, in the cancel processing, the second control unit returns the item to a placement region in which the item has been placed before being subjected to the drag operation.

16. The information processing apparatus according to claim 9, wherein, in the cancel processing, the second control unit sets a movement speed of the item used in a case where a distance by which the item moves is a first distance lower than a movement speed of the item used in a case where the distance is a second distance longer than the first distance.

17. A display control method comprising:
 moving an item placed at a predetermined placement region of a plurality of placement regions set in a display region of a display unit, based on a drag operation of a user;
 performing, in response to the drag operation being released in an area other than the plurality of placement regions, cancel processing for placing the item in any placement region of the plurality of placement regions; and
 stopping, in response to a user operation being performed on the display region while the cancel processing is performed, the cancel processing,
 further comprising performing, as the cancel processing, processing for causing the item to remain within a predetermined range for a predetermined time and processing for moving the item from the predetermined range to the any placement region after the predetermined time elapses.

18. The display control method according to claim 17, further comprising, after stopping the cancel processing, bringing the item into a state enabling a drag operation of the user to be performed thereon.

19. The display control method according to claim 17, further comprising, while causing the item to remain within the predetermined range, causing the item to undergo a predetermined change.

20. The display control method according to claim 17, further comprising:
 stopping, even in a case where inputting to an area other than the item of the display region by the user is received before the cancel processing is completed, the cancel processing; and
 placing the item at a position corresponding to the inputting.

21. The display control method according to claim 17, further comprising:
 laying out an image into a slot included in a template; and
 moving, after layout is performed, an image located in the slot as the item based on a drag operation of the user.

22. The display control method according to claim 17, further comprising moving an application icon as the item based on a drag operation of the user.

23. The display control method according to claim 17, further comprising, in the cancel processing, returning the item to a placement region in which the item has been placed before being subjected to the drag operation.

24. The display control method according to claim 17, further comprising, in the cancel processing, setting a movement speed of the item used in a case where a distance by which the item moves is a first distance lower than a movement speed of the item used in a case where the distance is a second distance longer than the first distance.

* * * * *